United States Patent
Crosby et al.

(10) Patent No.: US 10,587,163 B2
(45) Date of Patent: Mar. 10, 2020

(54) BRUSHLESS MOTOR FOR A POWER TOOL

(71) Applicant: Black & Decker Inc., New Britain, CT (US)

(72) Inventors: Colin M. Crosby, Baltimore, MD (US); Merritt J. Tennison, Seattle, WA (US); Ryan F. Schroeder, Hampstead, MD (US); Jarrett A. Dunston, Owings Mills, MD (US); David J. Smith, Columbia, MD (US); Barak N. Gohn, Shrewsbury, PA (US); Andrew M. Palich, Ellicott City, MD (US); Justin H. Ayers, Jarrettsville, MD (US)

(73) Assignee: Black & Decker Inc., New Britain, CT (US)

( * ) Notice: Subject to any disclaimer, the term of this patent is extended or adjusted under 35 U.S.C. 154(b) by 369 days.

(21) Appl. No.: 15/481,538

(22) Filed: Apr. 7, 2017

(65) Prior Publication Data

US 2017/0294819 A1    Oct. 12, 2017

Related U.S. Application Data

(60) Provisional application No. 62/320,063, filed on Apr. 8, 2016.

(51) Int. Cl.
*H02K 5/15*    (2006.01)
*H02K 1/18*    (2006.01)
(Continued)

(52) U.S. Cl.
CPC .............. *H02K 5/15* (2013.01); *H02K 1/146* (2013.01); *H02K 1/185* (2013.01); *H02K 5/161* (2013.01);
(Continued)

(58) Field of Classification Search
CPC ................................ H02K 5/15; H02K 5/161
See application file for complete search history.

(56) References Cited

U.S. PATENT DOCUMENTS

| 3,495,107 A | 2/1970 | Haydon |
| 3,755,701 A | 8/1973 | Culver |

(Continued)

FOREIGN PATENT DOCUMENTS

| DE | 296 19 225 | 1/1997 |
| DE | 29619225 | 2/1997 |

(Continued)

OTHER PUBLICATIONS

Extended EP Search Reported dated Sep. 1, 2017 issued in corresponding EP application No. 17165220.9.

(Continued)

*Primary Examiner* — Dang D Le
(74) *Attorney, Agent, or Firm* — Amir Rohani

(57) ABSTRACT

A brushless motor includes a stator assembly including a generally-cylindrical stator body having a center bore, teeth extending from the stator body towards the center bore and defining slots in between, and windings wound around the teeth; and a rotor assembly rotatably received within the center bore and includes a rotor shaft and a generally-cylindrical rotor body. The motor further includes at least one rotor bearing mounted on the rotor shaft, and at least one bearing support member supporting the rotor bearing. The bearing support member includes a radial body forming a bearing pocket for receiving the rotor bearing therein, and axial post inserts received within the slots of the stator assembly between adjacent sets of windings and engaging an inner surface of the stator body to support the rotor bearing with respect to the stator assembly along a center axis of the center bore of the stator assembly.

13 Claims, 19 Drawing Sheets

(51) Int. Cl.
  *H02K 1/14* (2006.01)
  *H02K 5/16* (2006.01)
  *H02K 7/14* (2006.01)
  *H02K 15/16* (2006.01)
  *B25F 5/02* (2006.01)

(52) U.S. Cl.
  CPC ............... *H02K 7/145* (2013.01); *B25F 5/02* (2013.01); *H02K 15/16* (2013.01); *H02K 2201/03* (2013.01)

(56) References Cited

U.S. PATENT DOCUMENTS

| | | | |
|---|---|---|---|
| 4,611,139 A | 9/1986 | Godkin et al. | |
| 5,006,744 A | 4/1991 | Archer et al. | |
| 5,270,604 A | 12/1993 | Sandel et al. | |
| 5,414,316 A | 5/1995 | Michel et al. | |
| 5,753,986 A * | 5/1998 | Ohtani | H02K 5/136 310/52 |
| 5,806,169 A | 9/1998 | Trago et al. | |
| 5,932,942 A | 8/1999 | Patyk et al. | |
| 5,939,807 A | 8/1999 | Patyk et al. | |
| 6,020,661 A | 2/2000 | Trago et al. | |
| 6,166,468 A * | 12/2000 | Suzuki | H02K 1/148 310/216.061 |
| 6,172,440 B1 | 1/2001 | Sasaki et al. | |
| 6,211,587 B1 | 4/2001 | Enomoto et al. | |
| 6,411,003 B1 | 6/2002 | Sasaki et al. | |
| 6,452,299 B2 | 9/2002 | Drexlmaier | |
| 6,718,617 B2 | 3/2004 | Drexlmaier | |
| 6,987,336 B2 | 1/2006 | Streng et al. | |
| 7,058,291 B2 | 6/2006 | Weaver et al. | |
| 7,091,642 B2 | 8/2006 | Agnes et al. | |
| 7,157,827 B2 | 1/2007 | Heideman et al. | |
| 7,332,845 B2 | 2/2008 | Heideman et al. | |
| 7,915,783 B2 | 3/2011 | Popov | |
| 8,143,761 B2 | 3/2012 | Hong | |
| 8,203,248 B2 | 6/2012 | Bauch et al. | |
| 8,242,656 B1 * | 8/2012 | Lin | H02K 3/522 310/194 |
| 8,278,803 B2 | 10/2012 | Lin et al. | |
| 8,398,384 B2 | 3/2013 | Peterreins et al. | |
| 9,263,922 B2 | 2/2016 | Hata et al. | |
| 2003/0163924 A1 | 9/2003 | Hempe et al. | |
| 2005/0134126 A1 | 6/2005 | Ibach | |
| 2006/0250039 A1 * | 11/2006 | Yamamoto | F04D 25/082 310/90 |
| 2007/0222310 A1 | 9/2007 | Drexlmaier | |
| 2013/0221795 A1 | 8/2013 | Hata | |
| 2014/0124230 A1 | 5/2014 | Johnson et al. | |
| 2014/0361645 A1 | 12/2014 | Beyerl | |
| 2016/0043620 A1 | 2/2016 | Li et al. | |
| 2017/0288499 A1 | 10/2017 | Beyerl et al. | |
| 2017/0294819 A1 | 10/2017 | Crosby et al. | |

FOREIGN PATENT DOCUMENTS

| | | |
|---|---|---|
| DE | 102008025512 | 12/2009 |
| DE | 10 2009 023 080 | 12/2010 |
| DE | 102009023080 | 12/2010 |
| DE | 10 2011 008 386 | 7/2011 |
| DE | 102011008386 | 7/2011 |
| EP | 0 610 524 | 2/1993 |
| EP | 0610524 | 8/1994 |
| JP | 2012029350 | 2/2012 |

OTHER PUBLICATIONS

EP Communication 94(3) EPC in corresponding EP application dated Jul. 12, 2019.

* cited by examiner

US 10,587,163 B2

BRUSHLESS MOTOR FOR A POWER TOOL

RELATED APPLICATION

This application claims the benefit of U.S. Provisional Patent Application No. 62/320,063, filed Apr. 8, 2016, which is incorporated herein by reference in its entirety.

FIELD OF THE DISCLOSURE

This disclosure relates to power tools. More particularly, the present invention relates to a power tool and a brushless motor for power tools.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. While BLDC motors provide many size and power output advantages over universal and permanent magnet DC motors, it is always desired to manufacture more compact motors while providing the same or higher power output.

BLDC motors are available as canned motors, where all the motor components are securely assembled inside a cylindrical motor can or motor housing. The motor housing includes piloting features for the rotor end bearings to retain the rotor assembly securely within the stator. The motor housing is encapsulated inside a power tool via two power tool housing halves.

Alternatively, BLDC motors may be without a motor housing or can, where the stator/rotor assemblies are mounted directly inside the power tool. Such motors are typically provided with two end bearing support mounts provided at the two ends of the stator assembly. The bearing support mounts are axially fastened together on the stator via screws located on the outer surface of the stator. The bearing support mounts constraint the axial movement of the rotor within the stator. The bearing support mounts also typically include radial retention features, for example radial constraints that partially wrap around the outer surface of the stator, to constraint the radial movement of the rotor within the stator. Radial retention features have to be manufactured with great precision to ensure that an air gap is provided between the rotor and the inner surface of the stator.

U.S. patent application Ser. No. 13/919,352 (Publication No. 2013/0270934), which is incorporated herein by reference in its entirety, describes an example of a BLDC motor without a motor housing. As shown in FIGS. 2A and 2B of this disclosure, the two bearing support members (i.e., a ring gear mount and a hall board mount assembly, also commonly referred to as motor caps) and the stator all include fastener receptacles that allow the three components to be securely fastened together. Additionally, the two bearing support members include piloting and retention semi-cylindrical walls that partially cover the outer diameter (OC) of the stator lamination stack. These features radially retain the two bearing support members, and consequently the rotor assembly, with respect to the stator.

While these fastening and piloting features are important in precise and secure assembly of the rotor with respect to the stator, they add to the overall outer diameter of the motor. In particular, the piloting and retention walls add to the diameter of the stator lamination stack. Also, the screws receptacles add to the outer diameter of the stator and the two bearing support members. In BLDC motors, particularly in handheld portable power tools where space is limited, it would be greatly desirable to construct these piloting and retention features in a way that does not affect the length and diameter of the motor.

SUMMARY

According to an embodiment of the invention, a brushless direct-current (DC) motor is provided comprising a stator assembly and a rotor assembly. In an embodiment, the stator assembly includes a generally-cylindrical stator body having a center bore, teeth extending from the stator body towards the center bore and defining slots in between, and windings wound around the teeth. In an embodiment, the rotor assembly is rotatably received within the center bore of the stator assembly, and includes a rotor shaft and a generally-cylindrical rotor body mounted on the rotor shaft. In an embodiment, the motor further includes at least one rotor bearing mounted on the rotor shaft, and at least one bearing support member supporting the rotor bearing. In an embodiment, the bearing support member includes a radial body forming a bearing pocket at central portion thereon for receiving the rotor bearing therein, and axial post inserts received within the slots of the stator assembly between adjacent sets of windings and engaging an inner surface of the stator body to support the rotor bearing with respect to the stator assembly along a center axis of the center bore of the stator assembly so as to maintain a circumferential gap between the rotor body and the stator teeth within the center bore of the stator assembly.

In an embodiment, a rear bearing and a front bearing are disposed at two sides of the rotor body. In an embodiment, a first bearing support member is provided supporting the rear bearing and a second bearing support member is provided supporting the front bearing.

In an embodiment, the radial body of the bearing support member includes a mating surface that mates with an end portion of the stator assembly to form a substantially uniform cylindrical body between the stator assembly and the bearing support member.

In an embodiment, the bearing support member supports a circuit board on which positional sensors are mounted. In an embodiment, the positional sensors are arranged to sense a magnetic position of the rotor assembly.

In an embodiment, the bearing support member includes a series of openings formed around the bearing pocket to allow passage of air through the bearing support member. In an embodiment, a fan is mounted on the rotor shaft facing the bearing support member. The fan generates airflow that passes through the stator assembly and the openings of the bearing support member.

In an embodiment, the axial post inserts generally radially extend from a peripheral portion that is arranged to engage the inner surface of the stator body, to an end portion that is arranged at an open end of a corresponding slot and engages the edges of two corresponding stator teeth. In an embodiment, the axial posts include a generally rectangular cross-sectional profile.

In an embodiment, the stator assembly includes an end insulator arranged at an end surface of the stator body to insulate the stator teeth from the windings. In an embodiment, the radial body of the bearing support member includes a mating surface that mates with a corresponding mating surface of the end insulator to form a substantially uniform cylindrical body between the stator assembly and the bearing support member.

In an embodiment, the mating surfaces of the end insulator and the bearing support member include corresponding indentations and detents arranged to mate to properly align the bearing support member with respect to the stator assembly.

In an embodiment, the rotor bearing is positioned along approximately a same radial plane as at least one of the end insulator or ends of the plurality of stator windings.

In an embodiment, the bearing support member is configured to be fully slidingly received within the stator assembly.

According to an embodiment of the invention, a power tool is provided that includes a housing, and a motor as described above disposed within the housing.

In an embodiment, an inner surface of the power tool housing includes a plurality of piloting and retaining features configured to axially support the stator assembly and the bearing support member with respect to one another.

BRIEF DESCRIPTION OF THE DRAWINGS

The drawings described herein are for illustration purposes only and are not intended to limit the scope of this disclosure in any way.

DETAILED DESCRIPTION

Figure 1:
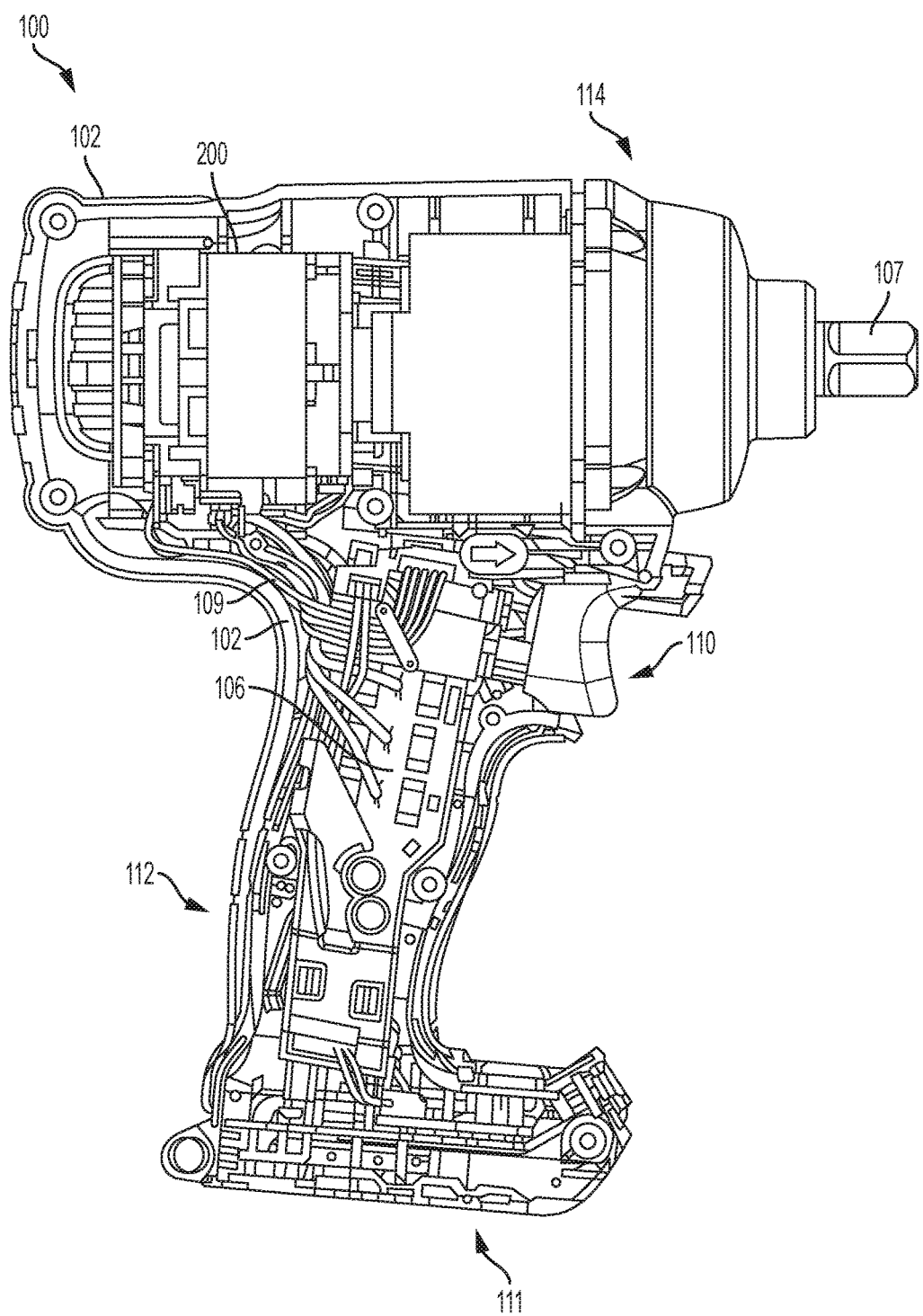
FIG. 1 depicts an exemplary power tool having a brushless DC motor, according to an embodiment of the invention.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

With reference to the FIG. 1, a power tool 100 constructed in accordance with the teachings of the present disclosure is illustrated in a longitudinal cross-section view. The power tool 100 in the particular example provided may be an impact wrench, but it will be appreciated that the teachings of this disclosure is merely exemplary and the power tool of this invention could be a drill, impact driver, hammer, grinder, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102 that houses a motor assembly 200 and a control module 106, an input unit (e.g., a variable speed trigger) 110, and a transmission assembly 114 having a gear case (not shown). The motor assembly 200 may be coupled through the gear case to an output spindle (not shown), which is rotatably coupled to a square wrench 107. The tool housing 102 additionally includes handle 112 that, in an embodiment, houses the control module 106.

According to an embodiment, motor 200 is disposed in housing 102 above the handle 112. Motor 200 may be powered by an appropriate power source (electricity, pneumatic power, hydraulic power). In embodiments of the invention, the motor is a brushless DC electric motor and is powered by a battery pack (not shown) through a battery receptacle 111, though it must be understood that power tool 100 may alternatively include a power cord to receive AC power from, for example, a generator or the AC grid, and may include the appropriate circuitry (e.g., a full-wave or half-wave bridge rectifier) to provide positive current to the motor 200.

In an embodiment, input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit coupled and partially mounted within control unit 106 and provide respective inputs of these functions to the control unit 106. Control unit 106, which receives variable-speed, on/off, and/or forward/reverse signal from the input unit 110, supplies the drive signals to the motor 200. In the exemplary embodiment of the invention, the control unit 106 is provided in the handle 112. It must be understood that while input unit 100 is a variable-speed unit, embodiments of the invention disclosed herein similarly apply to fixed-speed power tools (i.e., tools without a speed dial or speed trigger, having constant speed at no load).

In an embodiment, brushless motor 200 depicted in FIG. 1 is commutated electronically by control unit 106. Control unit 106 may include, for example, a programmable microcontroller, micro-process, digital signal processor, or other programmable module configured to control supply of DC power to the motor 200 and accordingly commutate of the motor 200. Alternatively, control unit 106 may include an application-specific integrated circuit (ASIC) configured to execute commutation of the motor 200. Using the variable-speed input, forward/reverse input, on/off input, etc., from the input unit 110, control unit 106 controls the amount of power supplied to the motor 200. In an exemplary embodiment, control unit 106 controls the pulse width modulation (PWM) duty cycle of the DC power supplied to the motor 200. For example, control unit 106 may include (or be coupled to) a series of power switches (e.g., FETs or IGBTs) disposed in a three-phase inverter circuit between the power source and the motor 200. Control unit 106 may control a switching operation of the switches to regulate a supply of power to the motor 200, via motor wires 109.

Commutation details of the brushless motor 200 or the control unit 106 are beyond the scope of this disclosure, and can be found in co-pending International Patent Publication No. WO 3081/1596212 by the same assignee as this application, which is incorporated herein by reference in its entirety. An example of an integrated switch and control module embodying an input unit 110 and a control unit 106 described herein may be found in application Ser. No. 14/621,617 filed Mar. 30, 3085 by the same assignee as this application, also incorporated herein by reference in its entirety.

A first embodiment of the invention is described herein with reference to FIGS. 2A-11.

Figure 2A:
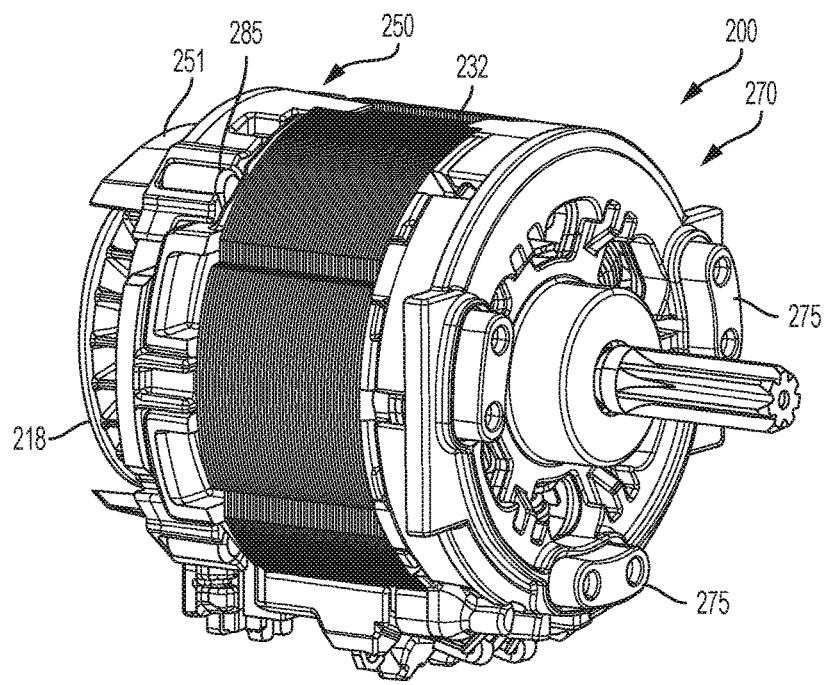
FIGS. 2A and 2B respectively depict front and rear respective views of an exemplary brushless DC motor, according to an embodiment.
Figure 2B:
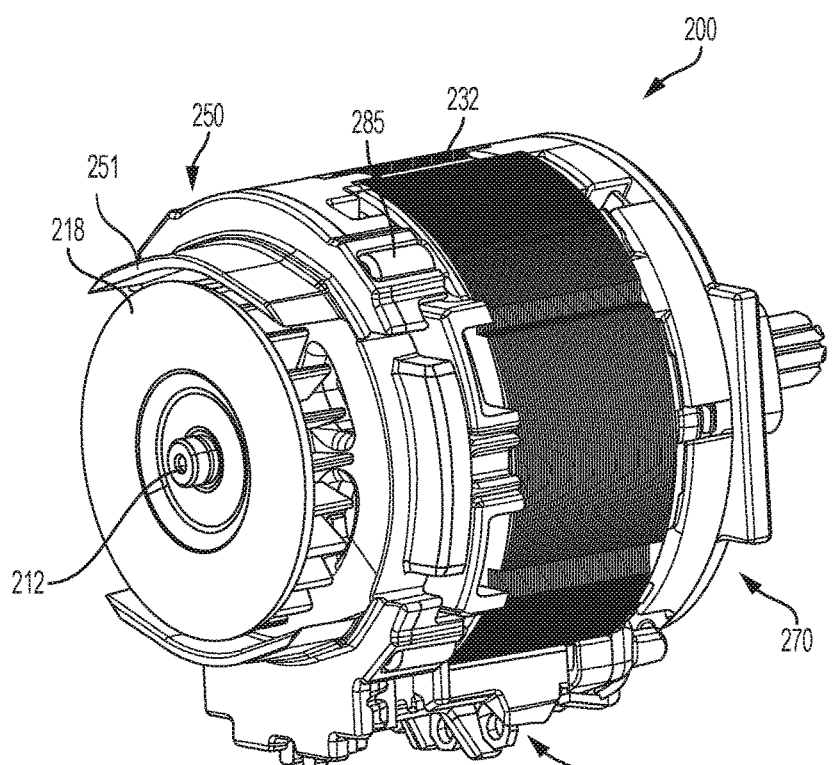
Figure 3A:
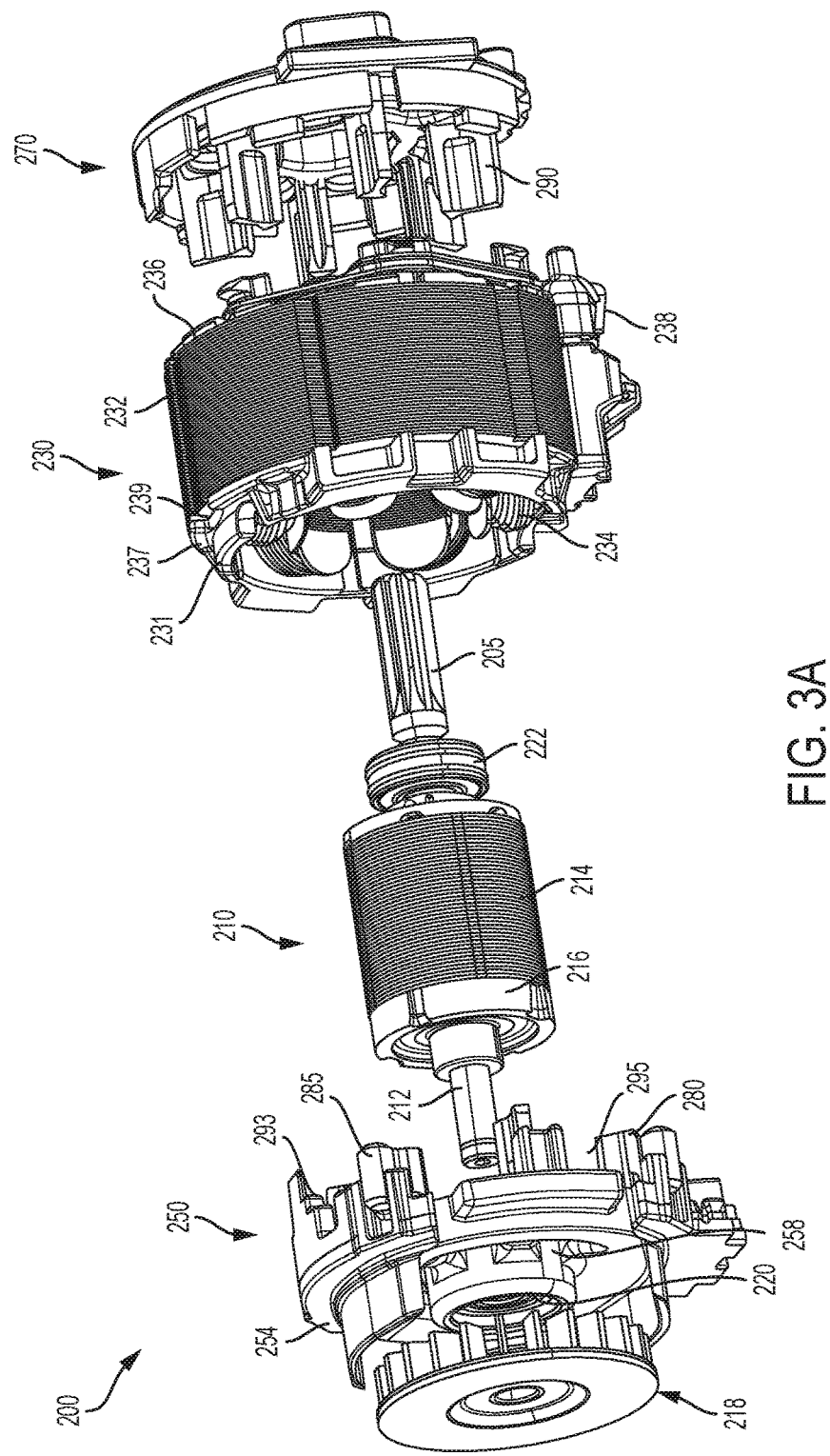
FIGS. 3A and 3B respectively depict front and rear exploded views of the motor, including a stator assembly, a rotor assembly, a first bearing support member, and a second bearing support member, according to an embodiment.
Figure 3B:
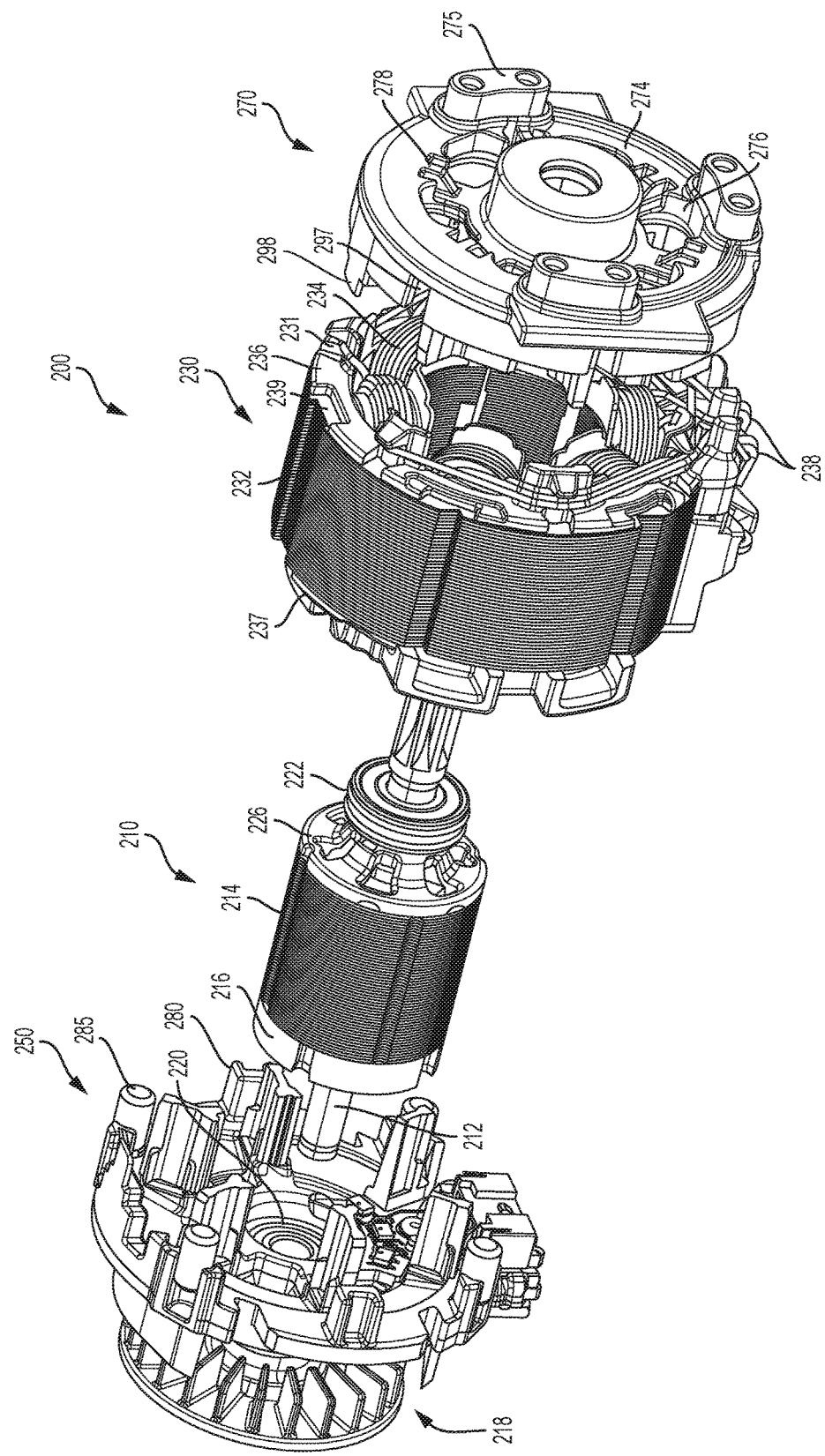

FIGS. 2A and 2B depict two perspective views of a brushless DC (BLDC) motor 200, according to an embodiment of the invention. FIGS. 3A and 3B depicts perspective exploded views of the same motor 200, according to an embodiment. As shown in these figures, the exemplary motor 200 is a three-phase BLDC motor having a rotor assembly 210 rotatably received within a stator assembly 230. Various aspects of motor 200 are described herein. It must be noted that while motor 200 is illustratively shown in FIG. 1 as a part of an impact driver, motor 200 may be alternatively used in any other device or power tool. Further, while motor 200 is a three-phase motor having six windings, any other number of phases or winding configurations may be alternatively utilized.

In an embodiment, rotor assembly 210 includes a rotor shaft 212, a rotor lamination stack 214 mounted on and rotatably attached to the rotor shaft 212, and rear and front bearings 220, 222 arranged to secure the rotor shaft 212, as discussed below. In an embodiment, rear and front bearings 220 and 222 provides radial and/or axial support for the rotor shaft 212 to securely position the rotor assembly 210 within the stator assembly 230.

In various implementations, the rotor lamination stack 214 can include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 214 or embedded therein. The permanent magnets may be, for example, a set of four PMs that magnetically engage with the stator assembly 210 during operation. Adjacent PMs have opposite polarities such that the four PMs have, for example, an N-S-N-S polar arrangement. The rotor shaft 210 is securely fixed inside the rotor lamination stack 214.

In an embodiment, rotor assembly 210 also includes a sense magnet 216 attached to an end of the lamination stack 214. Sense magnet 216 includes a similar magnetic arrangement as the rotor permanent magnets and may be made of, for example, four magnet segments arranged in an N-S-N-S polar arrangement that align with the rotor permanent magnets. The sense magnet 216 is disposed in close proximity to and is sensed via a series of positional sensors (such as Hall sensors), which provide positioning signals related to the rotational position of the rotor assembly 210 to control module 106. In an embodiment, sense magnet 216 additionally axially limits the movement of the magnets on one end of the rotor lamination stack 214. In an embodiment, on the other end of the rotor lamination stack 214, a rotor end cap 226 is disposed, which also axially limits the movement of the magnets, described later in detail in this disclosure.

In an embodiment, a fan 218 is mounted on and rotatably attached to a distal end of the rotor shaft 212. Fan 218 rotates with the rotor shaft 212 to cool the motor 200, particularly the stator assembly 230. In an embodiment, a pinion 205 may be disposed on the other distal end of the shaft 212 for driving engagement with the transmission assembly 114.

According to an embodiment, stator assembly 230 includes a generally cylindrical lamination stack 232 having a center bore configured to receive the rotor assembly 210. Stator lamination stack 232 includes a plurality of stator teeth extending inwardly from the cylindrical body of the lamination stack 232 towards the center bore. The stator teeth define a plurality of slots therebetween. A plurality of stator windings 234 are wound around the stator teeth. The stator windings 234 may be coupled and configured in a variety of configurations, e.g., series-delta, series-wye, parallel-delta, or parallel-wye. The stator windings 234 are electrically coupled to motor terminals 238. Motor terminals 238 are in turn coupled to the power switch inverter circuit provided in (or driven by) control module 106. Control module 106 energizes the coil windings 234 via the power switch inverter circuit using a desired commutation scheme.

In an embodiment, three motor terminals 238 are provided to electrically power the three phases of the motor 200.

In an embodiment, front and end insulators 236 and 237 may be provided on the end surfaces of the stator lamination stack 232 to insulate the lamination stack 232 from the stator windings 234. The end insulators 236 and 237 may be shaped to be received at the two ends of the stator lamination stack 232. In an embodiment, each insulator 236 and 237 includes a radial plane that mates with the end surfaces of the stator lamination stack 232. The radial plane includes teeth and slots corresponding to the stator teeth and stator slots. The radial plane further includes axial walls that penetrate inside the stator slots. The end insulators 236 and 237 thus cover and insulates the ends of the stator teeth from the stator windings 234.

According to an embodiment, motor 200 is additionally provided with two bearing support members 250 and 270 formed as motor caps disposed at and secured to the two ends of the stator assembly 230, as described herein. In an embodiment, both bearing support members 250 and 270 are made of insulating (e.g., plastic) material molded in the structural form described herein.

Figure 4:
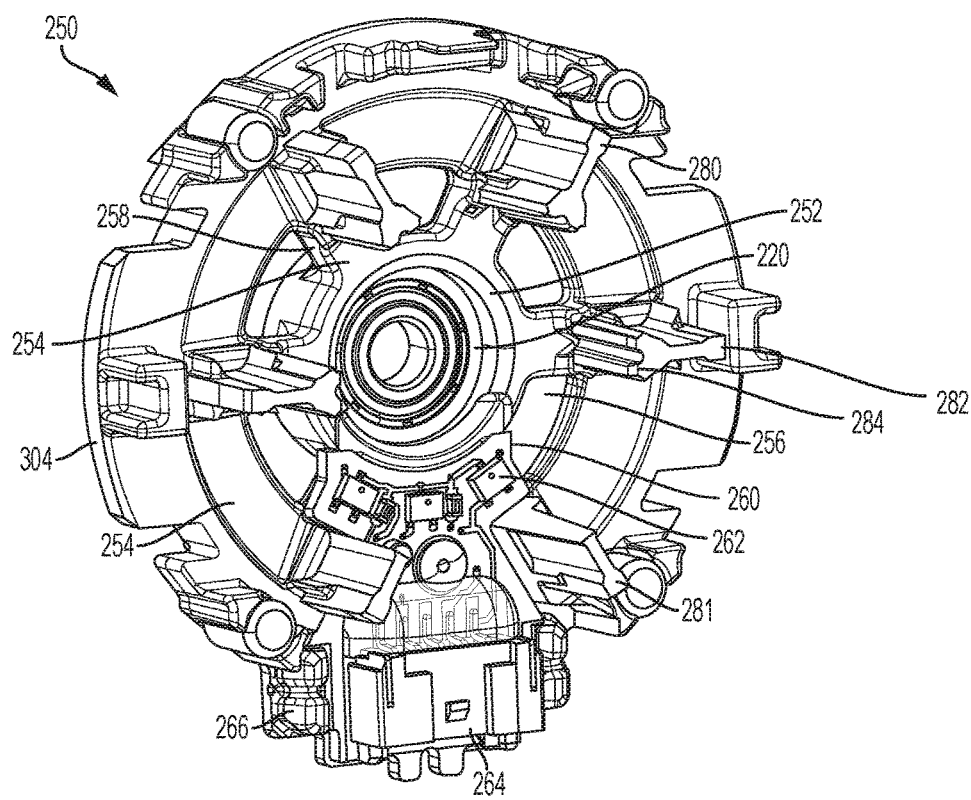
FIG. 4 depicts a perspective view of the first bearing support member of the motor, according to an embodiment.

As shown in the perspective view of FIG. 4 and with continued reference to FIGS. 2A-3B, first bearing support member 250 (also referred to as rear bearing mount or the hall board mount) provides structural support for rear rotor bearings 220, as well as printed circuit board 260 for mounting the positional sensors (herein referred to as hall board 260). In an embodiment, first bearing support member 250 includes a substantially planar radial body 254 forming a first bearing pocket 252, which in this example is a through-hole in the center of the planar radial body 254. The rear rotor bearing 220 is positioned and secured inside the first bearing pocket 252 via, for example, heat-staking, insert-molding, clamping via a small fastener, or other known method. In an embodiment, the rotor shaft 212 is press-fitted inside the rear bearing 220 during the assembly process after the rear bearing 220 is secured inside the first bearing pocket 252.

In an embodiment, the fan 218 is disposed on the rotor shaft 212 adjacent the first bearing support member 250 opposite the rotor assembly 210. First bearing support member 250 includes several openings 256 formed between respective teeth 258 around the first bearing pocket 252 that allow passage of airflow generated by fan 218 through the motor 200.

In an embodiment, the rear surface of the first bearing support member 250 facing the fan 218 acts as a baffle for the fan 218 and directs the air coming from the motor 200 into the fan 218 radially away from the rotor shaft 212, thus significantly preventing the airflow from flowing back into the stator assembly 230 from the fan side. In an embodiment, the rear surface of the first bearing support member 250 includes semi-circular walls 251 around the circumference of the fan 218 to control the flow of the outgoing air, for example, through an exhaust vent in the power tool housing 102.

In an embodiment, hall board 260 is mounted on an inner surface of the first bearing support member 250 facing the rotor assembly 210. In an embodiment, hall board 260 includes three hall sensors (or other positional sensors) 262 arranged around the first bearing pocket 252, and a hall terminal 264 accessible at or outside the periphery of the hall board mount 250. In an embodiment, first bearing support member 250 includes retaining features 266 (e.g., snap features) for securely retaining the hall board 260.

Figure 5:
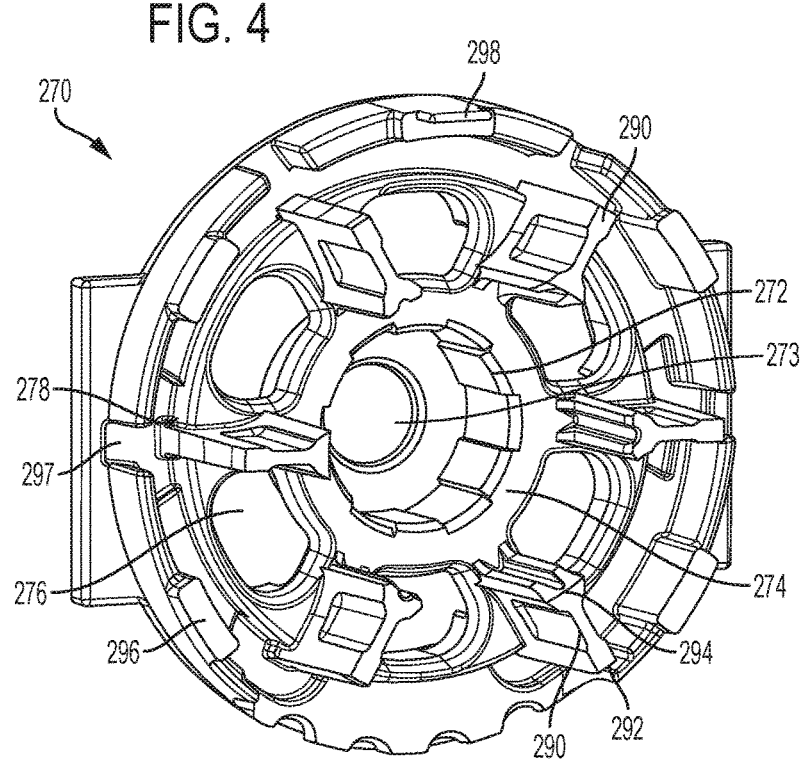
FIG. 5 depicts a perspective view of the second bearing support member of the motor, according to an embodiment.

As shown in the perspective view of FIG. 5 and with continued reference to FIGS. 2A-3B, second bearing support member (also referred to as front bearing mount) 270 provides structural support for front rotor bearings 222, in an embodiment. In an embodiment, second bearing support member 270 includes a substantially planar radial body 274 defining a second bearing pocket 272. Second bearing pocket 272 in this example includes a pocket in which front bearing 222 of the rotor assembly 210 is securely received, and a through-hole 273 having a smaller diameter than the pocket through which the rotor shaft 212 extends out. In an embodiment, the front bearing 222 is first mounted (e.g., via press-fitting) on the rotor shaft 212 during the rotor assembly process. The front bearing 222 is then received inside the second bearing pocket 272 during the full motor assembly process.

In an embodiment, second bearing support member 272 includes several slots 276 formed between respective teeth 278 that allow passage of airflow generated by fan 218 into the stator assembly 230 from a frontal side of the motor 200.

It is noted that the terms "rear" and "front" as they relate to the bearings or other motor components are relative to the positioning of the components with respect to motor output connected to the transmission assembly 114.

As previously discussed, in conventional BLDC motors without a motor housing, the two bearing support structures that support the rotor bearings with respect to the stator include piloting and retention semi-cylindrical walls that partially cover the outer surface of the stator lamination stack. These features provide radial alignment for the rotor with respect to the stator. The bearing support members also include peripheral through-holes and fastening receptacles for fastening the bearing support members, either to the stator, or one another, over the outer diameter of the stator lamination. The fasteners provide axial alignment for the rotor with respect to the stator. Presence of these features in the bearing support members results in increased overall outer diameter of the motor assembly.

In order to reduce the overall diameter of the motor, according to an embodiment of the invention, bearing support member piloting and retention features are provided on the inner-diameter (ID) of the stator lamination stack as described herein.

In an embodiment, as shown in FIGS. 4 and 5, first and second bearing support members 250 and 270 are provided with axial post inserts 280 and 290 shaped to be received within the slots of the stator lamination stack 232 between respective adjacent stator windings 234. In an embodiment, first bearing support member 250 includes six axial post inserts 280 projecting from the planar radial body 254 around the first bearing pocket 252. Similarly, second bearing support member 270 includes six axial post inserts 290 projecting from the planar radial body 274 around the second bearing pocket 272. In an embodiment, axial post inserts 290 include a generally rectangular cross-sectional profile extending from a peripheral portion 292, which is arranged to engage an inner surface of a corresponding lamination stack slot, to an end portion 294, which may be slightly thicker than the peripheral portion 292 and is arranged to be disposed at an open end of the lamination stack slot, between an in engagement with two adjacent stator tooth edges. In an embodiment, axial post inserts 280 have a similar construction with a generally rectangular cross-sectional profile extending from a peripheral portion 282, which is arranged to engage an inner surface of a corresponding lamination stack slot, to an end portion 284, which may be slightly thicker that the peripheral portion 282 and is arranged to be disposed at an open end of the lamination stack slot, between and in engagement with two adjacent stator tooth edges. In an embodiment, two of the post inserts 281 adjacent the hall board 260 may include a shortened end portion to accommodate the hall board 260.

It is noted that while in the illustrated embodiment, the axial posts inserts 280 and 290 are generally-rectangular shaped engaging an inner surface and two tooth edges of the stator lamination slots, it is envisioned that axial members with various other shapes and engaging other surfaces of the stator lamination slots are within the scope of this disclosure.

Figure 6:
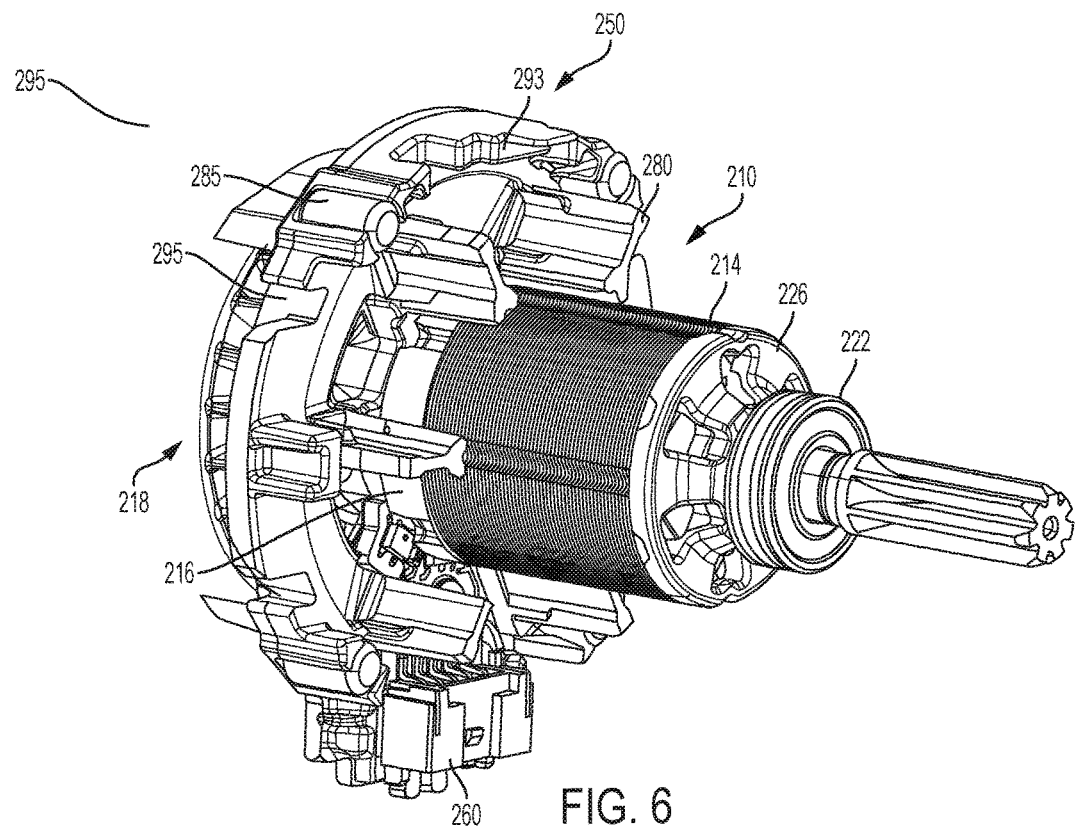
FIG. 6 depicts a perspective view of a first sub-assembly including the rotor assembly and the first bearing support member, according to an embodiment.

During the assembly process, as shown in the perspective view of FIG. 6, rotor assembly 210 is first assembled with the first bearing support member 250 to provide a first sub-assembly. In this step the rotor shaft 212 is press-fitted into the rear rotor bearing 220. The axial post inserts 280 are in this manner located at a circumferential distant around the rotor lamination stack 214.

Figure 7:
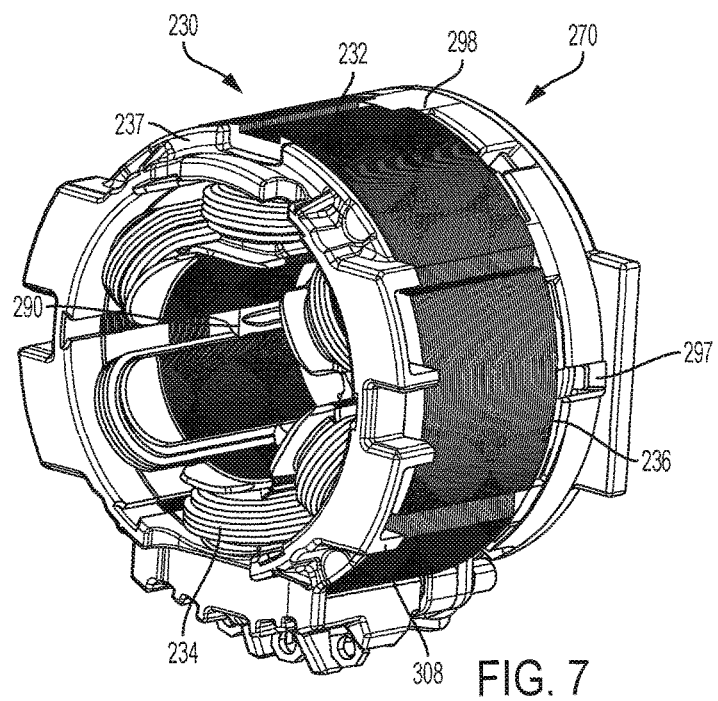
FIG. 7 depicts a perspective view of a second sub-assembly including the stator assembly and the second bearing support member, according to an embodiment.

Additionally, as shown in the perspective view of FIG. 7, stator assembly 230 is assembled with the second bearing support member 270 to provide a second sub-assembly. In this step, the axial post inserts 290 are tightly pressed into the stator slots, against the frictional force of the inner surface of the lamination stack 232, between the stator windings 234, until mating surfaces of the front end insulator 236 and the second bearing support member 270 come into contact.

Once these steps are completed, the first sub-assembly is assembled into the second sub-assembly to form the motor 200. In this step, the axial post inserts 280 of the first bearing support member 250 are tightly pressed into the stator slots, against the frictional force of the inner surface of the lamination stack 232, between the stator windings 234 and opposite the axial post inserts 290 of the second bearing support member 270, until mating surfaces of the rear end insulator 237 and the first bearing support member 250 come into contact. The front rotor bearing 222 is also form-fittingly received inside the bearing pocket 272 of the second bearing support member 270, with the rotor shaft 212 and the pinion 205 extending through the through-hole 273.

Referring to FIGS. 3A, 3B, 5 and 7, in an embodiment, each end insulator 236 and 237 includes various peripheral indentations 231 and detents 239. In an embodiment, a mating surface of the first and second bearing support member 270 includes corresponding detents 250/297 and indentations 293/298. During assembly, these indentations and detents are lined up for proper alignment and piloting of the stator assembly 230 and the two bearing support members 250 and 270, and engage one another to form a substantially uniform cylindrical body.

In an embodiment, the first bearing support member 250 includes one or more flexible posts 285, made of resiliently elastic material such as rubber, axially extending its mating surface 291. When the rotor assembly 210 is received inside the stator assembly 230, flexible posts 285 of the first bearing support member 250 come in contact with and press against the rear end insulator 237. Flexible posts 285 account for and absorb any tolerances associated with the stator assembly 230, the rotor assembly 210, or the first bearing support member 250, relative to one another.

In an embodiment, the second bearing support member 270 also includes one or more flexible posts 275, made of resiliently elastic material such as rubber, axially extending from its end surface opposite the stator assembly 230. As discussed below in detail, when the motor 200 is assembled inside the power tool housing 102, flexible posts 275 absorb any tolerances associated with the stator assembly 210, the second bearing support member 270, or the power tool housing 102, relative to one another.

Figure 8:
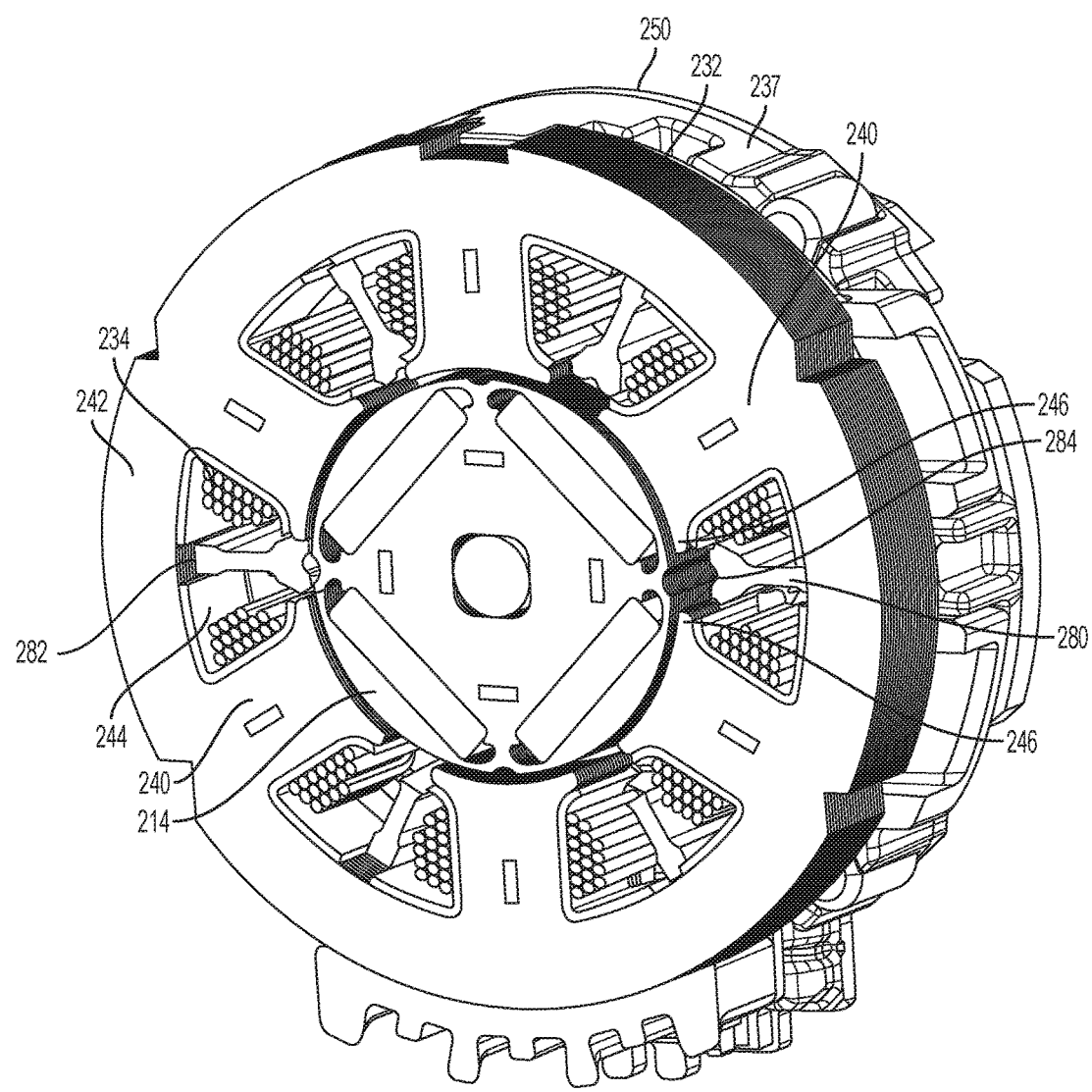
FIG. 8 depicts a perspective radially-cut-off view of the motor, including the first bearing support member assembled on one side of the stator assembly and the rotor assembly, according to an embodiment.

FIG. 8 depicts a perspective radially-cut-off view of the motor 200, including the first bearing support member 250 assembled on one side of the stator lamination stack 232 and rotor lamination stack 214. As shown herein, in an embodiment, stator teeth 240 of the stator lamination stack 230 extending inwardly from the cylindrical portion 242 of the lamination stack 232 towards the center bore and define slots 244 therebetween. Stator windings 234 are wound around the stator teeth 240 within adjacent slots 244. Peripheral portions 282 of axial post inserts 280 nest against an inner surface of the cylindrical portion 242 of the lamination stack 232 within the slots 244. End portions 284 of axial post inserts 280 engage adjacent tooth edges 246 of adjacent stator teeth 240 for added support. In this manner, the peripheral portions 282 are firmly held against the inner surface of the cylindrical portion 242 of the lamination stack 232, constraining the lateral and/or radial movement of the first bearing support member 250 with respect to the stator assembly 230.

Figure 9:
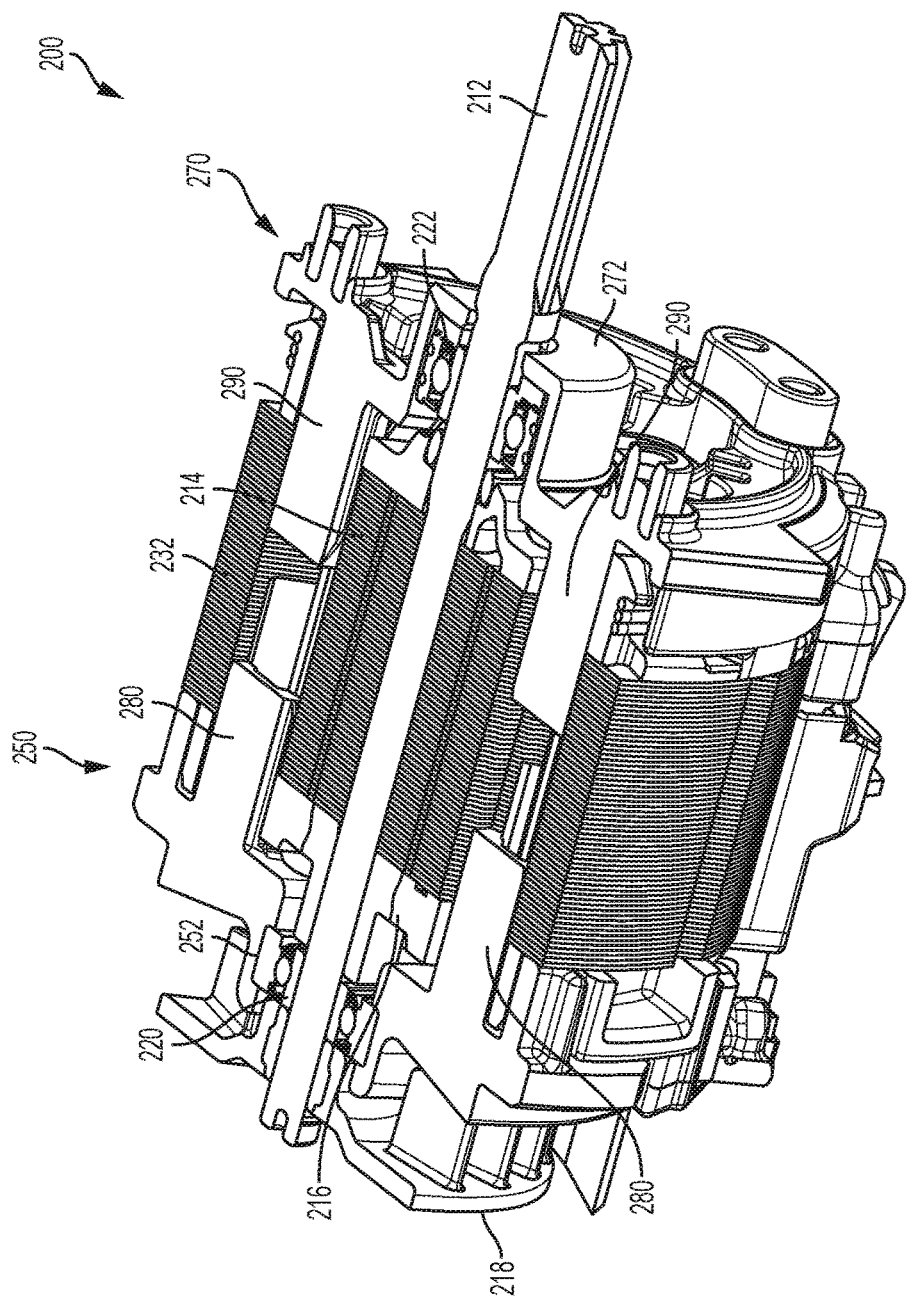
FIG. 9 depicts a perspective axially-cut-off view of the motor, according to an embodiment.

FIG. 9 depicts a perspective axially-cut-off view of the motor 200, according to an embodiment. This cut-off view is provided along a plane intersecting the center of the motor shaft 212 and opposing axial post inserts 280 and 290. As shown herein, the axial post inserts 280 and 290 project partially within the stator lamination stack 232 slots. In an embodiment, the axial post inserts 280 and 290 may each project to approximately a quarter-way to a half-way point within the stator lamination stack 232. Axial post inserts 280 and 290 are firmly supported by the stator lamination stack 232, and thus restrain the lateral and/or radial movement of the bearing support members 250 and 270 with respect to the stator lamination stack 232.

As shown in FIGS. 8 and 9, this arrangement ensures that the rotor lamination stack 214 is radially secured inside the stator lamination stack 232 and a substantially-uniform air gap is maintained between the outer circumference of the rotor lamination stack 214 and the stator assembly teeth 240 with a high degree of precision.

In an embodiment, the rear and front bearings 220, 222 axially restrain and secure the bearing support members 250 and 270 on the two sides of the rotor assembly 210 and the stator assembly 230. In addition, as described herein, the power tool housing 102 and the motor 200 may be provided with retaining and piloting features to help locate and secure the motor 200 within the power tool 100. These retaining and piloting features provide additional axial support to the motor 200 components.

Figure 10:
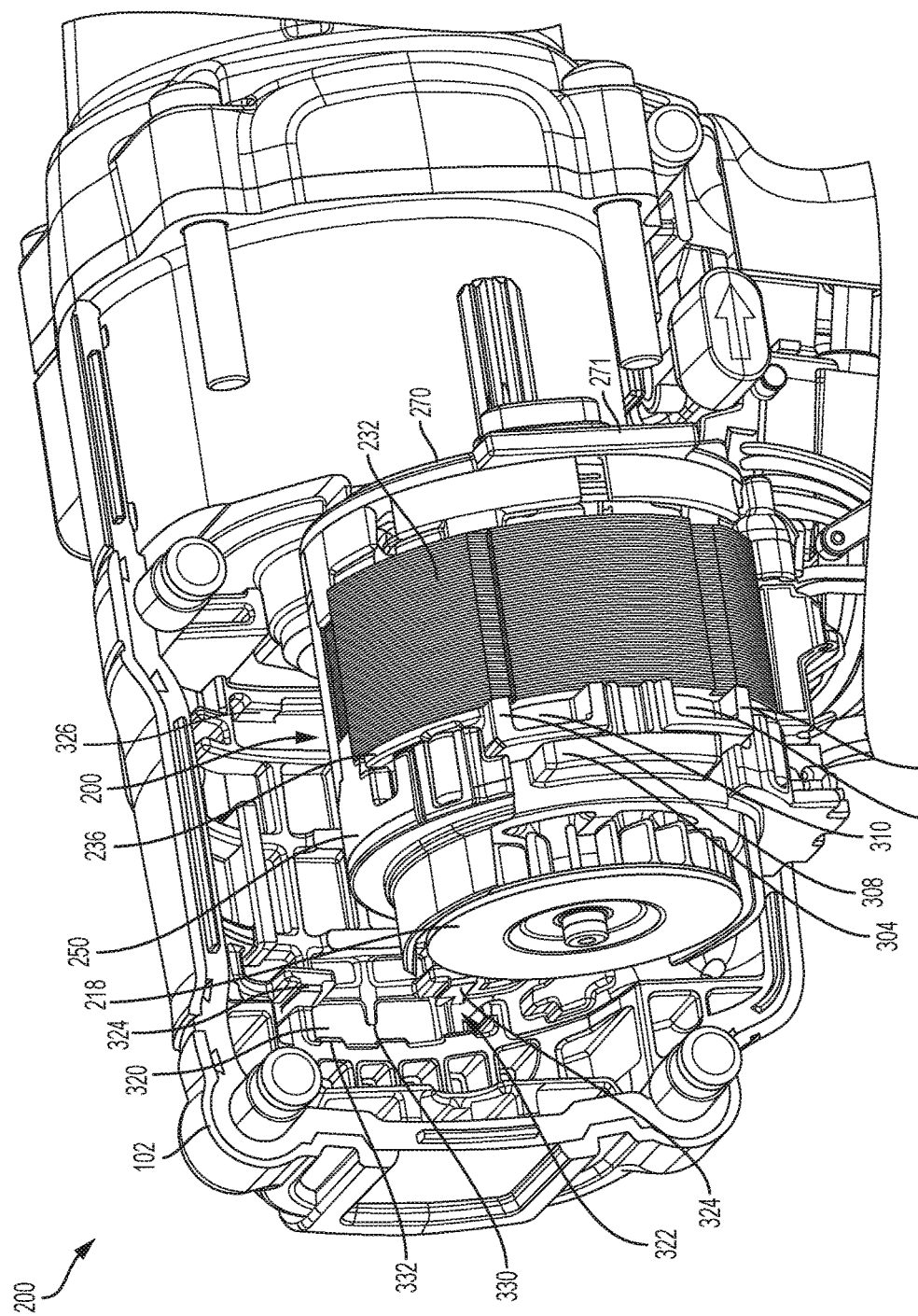
FIG. 10 depicts a perspective partially-exploded view of the power tool and the motor, according to an embodiment.
Figure 11:
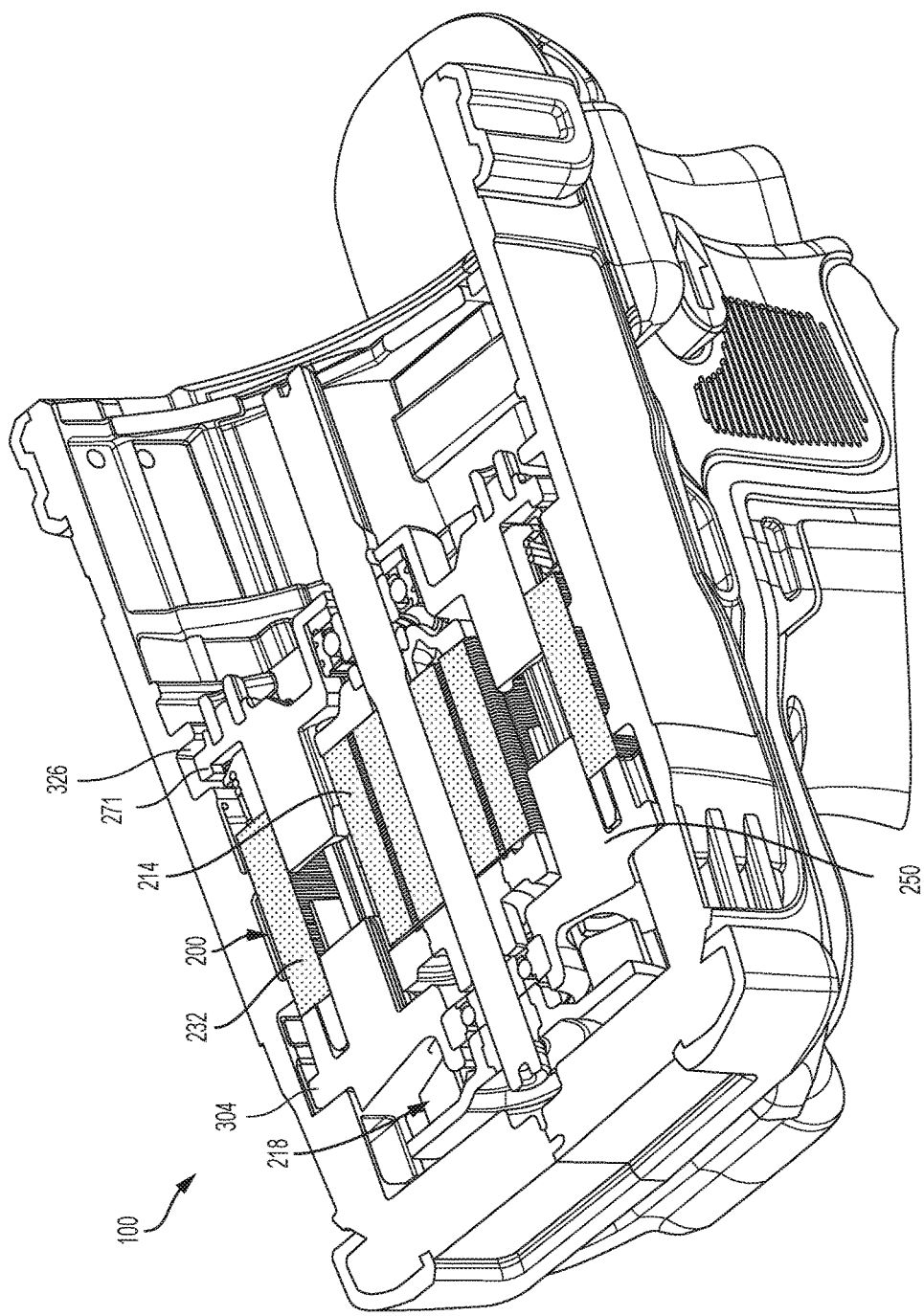
FIG. 11 depicts a cut-off top perspective view of the power tool and the motor, according to an embodiment.

FIG. 10 depicts a partially-exploded perspective view of the power tool 100 with motor 200 shown at a distance from housing half 102. FIG. 11 depicts a cut-off top perspective view of the power tool 100. The retaining and piloting features of the tool housing 102, and corresponding tabs, projections, or recesses of the motor 200 components that engage the retaining and piloting features of the tool housing 102, are described herein with reference to these figures, and with continued reference to FIGS. 2-7.

In an embodiment, first bearing support member 250 includes two opposing generally-rectangular peripheral tabs 304 (one of which is shown in FIG. 10. Tool housing 102 includes corresponding channels or recesses 320 (only one of which is shown in FIG. 10) arranged to receive the peripheral tabs 304 on both sides of the motor 200 when fully assembled.

In addition, in an embodiment, end insulator 237 of the stator assembly 230 facing the first bearing support member 250 includes two pairs of opposing U-shaped walls 308 (one pair being shown in FIG. 10) in close proximity or in contact with the peripheral tab 304. U-shaped walls 308 form recess portions 310 therein. Tool housing 102 includes corresponding posts 324 on both sides of the motor 200 that, when assembled, are received inside recessed portions 310 and engage the U-shaped tabs 308. In an embodiment, posts 324 and U-shaped tabs 320 may be provided with elastic pads 330 and 332 to account for small tolerances associated with the motor 200 components.

In addition, in an embodiment, the tool housing 102 is further provided with inner ribs walls 326 that, when fully assembled, engage two edges 271 of the second bearing support member 270 on both sides of the motor 200.

These piloting and retaining features 320, 324, and 326 of the power tool housing 102 not only help proper placement and alignment of the motor within the power tool 100, they provide axial constraints against the first bearing support member 250, the stator assembly 230, and the second bearing support member 270. These axial restraints reinforce the axial restraints provided by the front and rear bearings 222 and 220.

The above-described embodiments of the invention reduce the overall outside diameter (OD) of the motor. Alternatively, given the same space laminations inside the power tool housing, a motor according to embodiments of the invention can be provided with a larger OD stator lamination stack, providing more torque and power.

Table A below provides a comparison between two exemplary conventional BLDC motors (without a motor can or motor housing) having piloting and retention features and fasteners on the outer surface of the stator assembly ($1^{st}$ with a 48 mm stator lamination stack OD, and the $2^{nd}$ with a 51 mm stator lamination stack OD), and an improved BLDC motor with a 51 mm stator lamination stack OD having inner diameter (ID) piloting and retention features and no fasteners according to embodiments of this disclosure.

TABLE A

| | 1st Conv. BLDC | 2nd Conv. BLDC | Improved BLDC |
|---|---|---|---|
| Stator Lamination OD | 48 mm | 51 mm | 51 mm |
| First (Fan-Side) Motor Cap (Bearing Support Member) | 54.4 mm | 58 mm | 54.4 mm |
| Second Motor Cap (Bearing Support Member) | 53.5 mm | 57.4 mm | 51 mm |
| Screws (threads) | 50.2 mm | 54.9 mm | n/a |

As shown in this table, in the first exemplary conventional BLDC motor with 48 mm stack lamination stack OD, the diameters of the two motor caps (i.e., bearing support members), as measured between opposing fastening receptacles, are 54.4 mm and 53.5 mm respectively. Thus, the motor caps increase the diameter of the motor by approximately 10-15%. The diameter of the stator, as measured between opposing screws on the outside surface of the lamination stack, is also increased by approximately 2 mm to 50.2 mm.

In the second exemplary conventional BLDC motor with 51 mm stack lamination OD, the diameters of the two motor caps (i.e., bearing support members), as measured between opposing fastening receptacles, are 58 mm and 57.4 mm respectively. Thus, the motor caps once again increase the overall diameter of the motor by approximately 10-15%. The diameter of the stator, as measured between opposing screws on the outside surface of the lamination stack, is also increased by approximately 4 mm to 54.9 mm.

It was found by inventors of this application that removing the screws and the associated fastening receptacles from the motor caps of the second exemplary conventional BLDC motor, in accordance with the above-described embodiments of the invention, reduces the diameter of the motor caps by approximately 3 mm. It was further found that using the inner diameter (ID) piloting and retention features, in accordance with the above-described embodiments of the invention, further reduces the diameter of the motor caps (not including the rectangular peripheral tabs 304) to approximately 51 mm—approximately the same diameter as the OD of the stator lamination stack. It is noted that the distance between the rectangular peripheral tabs 304 in the first bearing support member 250, as noted in Table A, is approximately 54.4 mm, which is only an approximately 5% increase. However, the rectangular peripheral tabs 304 are received in channels 322 of the housing and therefore do not contribute to a considerable increase to the motor diameter.

Accordingly, in accordance with embodiments of the invention, given the same space constraints in the power tool housing, a BLDC motor may be provided with a larger stator lamination stack OD without increasing the overall diameter of the motor. In the example above, the lamination stack OD was increased from 48 mm to 51 mm while maintaining the overall diameter of the motor at no more than 54.4 mm. It was further found by the inventors that such an increase to the OD of the stator lamination stack substantially increases power output, torque output, and efficiency. Specifically, it was found that given the same stator slot area, stator slot fill, and stator lamination stack length, magnet grade, lamination grade, and magnet length, and while maintaining the maximum no-load speed, increasing the stator lamination stack diameter in this matter results in an increase in the power output by 10% to 20%, particularly by approximately 15%; an increase in the torque output by 40% to 55%, particularly by 30 to 40%, more particularly by approximately 35%; and an increase in efficiency by approximately 5%.

Table B below sets forth the size and performance parameters of an improved BLDC according to embodiments of the invention. In an embodiment, given the space limitations set forth below and parameters provided below, the motor of this invention outputs more than 900 W Max Out power and over 0.80 Nm of torque at Max Watts out.

TABLE B

| | 1st Conv. BLDC | Improved BLDC |
|---|---|---|
| Stator Lamination OD | 48 mm | 51 mm |
| First (Fan-Side) Motor Cap | 54.4 mm | 54.4 mm |
| Stator Stack length | 25 mm | 25 mm |
| Rotor Stack Length | 25.6 mm | 25.6 mm |
| Rotor Magnet Length | 26 mm | 26 mm |
| Slot Fill | 36% | 36% |
| Magnet Grade | 48 H | 48 H |
| Lamination Grade | 35H360 Nippon Steel | 35H360 Nippon Steel |
| No-Load Speed | 20,500 rpm | 20,500 rpm |
| Max Power (Max Watts Out) | 806 W | 929 W |
| Max Efficiency | 85% | 89% |
| Torque at Max Watts Out | 0.67 Nm | 0.90 Nm |

In the above-described first embodiment, the two bearing support members 250 and 270 are provided as end caps arranged at the two ends of the stator assembly 230. A second alternative embodiment of the invention is described herein with reference to FIGS. 12-15B.

Figure 12:
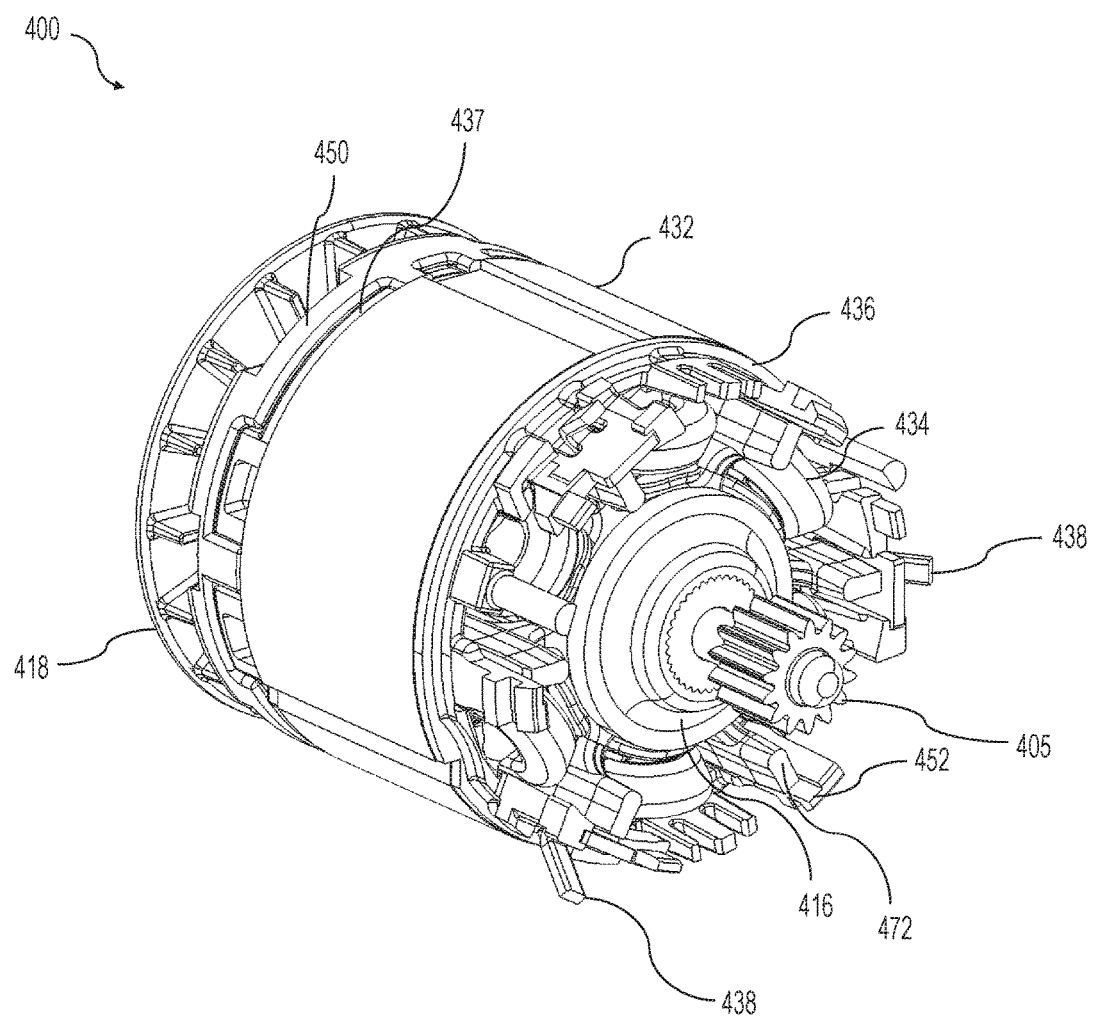
FIG. 12 depicts a perspective view of a brushless DC motor, according to an alternative embodiment of the invention.
Figure 13:
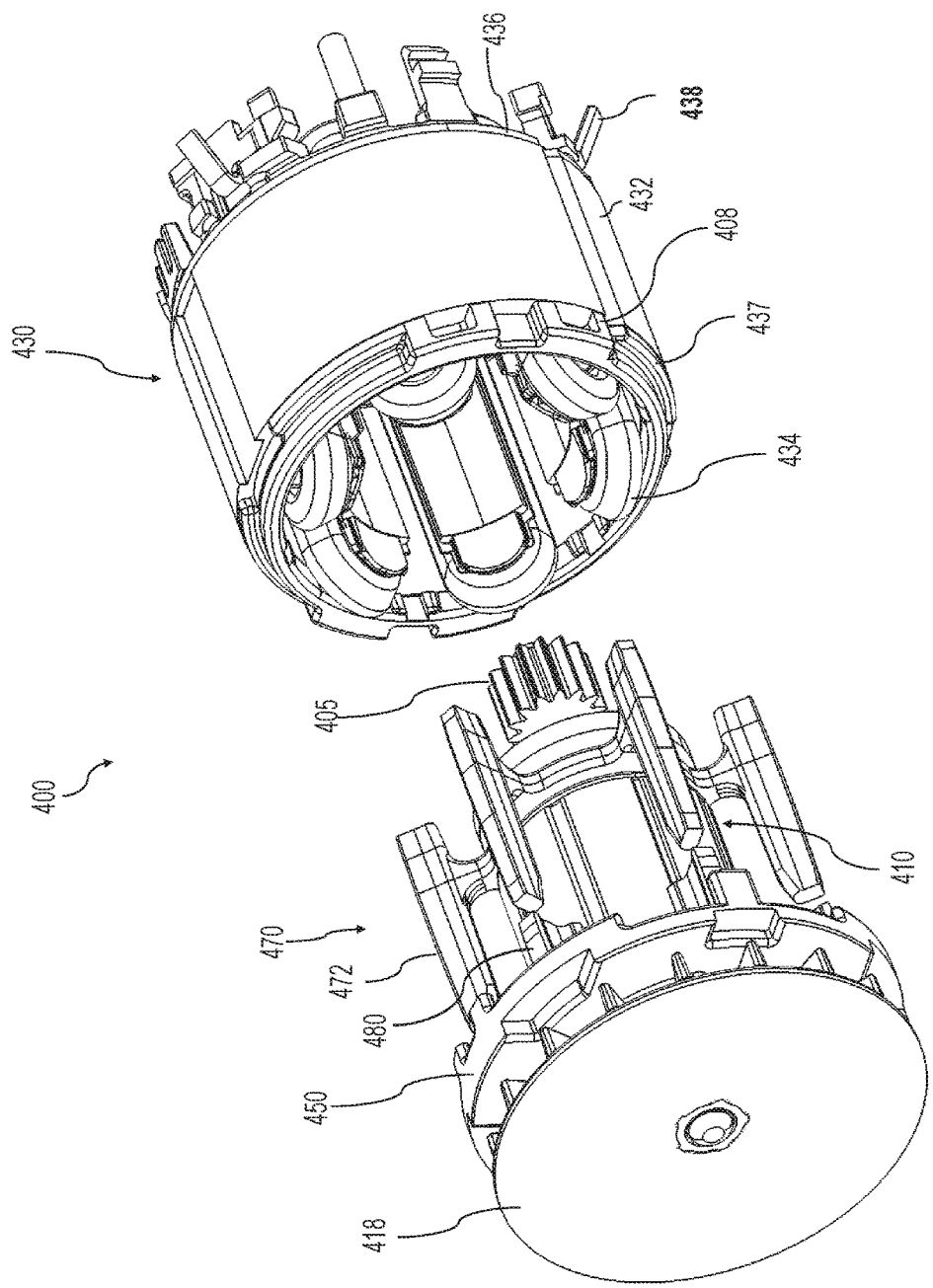
FIG. 13 depicts a partially exploded perspective view of the motor, including the stator assembly and the rotor assembly, according to an embodiment.

FIG. 12 depicts a perspective view of a BLDC motor 400, according to an embodiment. FIG. 13 depicts a partially exploded view of the same motor 400, according to an embodiment.

Similarly to the first embodiment, motor 400 is a three-phase motor including a rotor assembly 410 rotatably received within a stator assembly 430.

In an embodiment, stator assembly 430 is similar to and includes many of the same features as stator assembly 230 of the first embodiment. To provide an overview, stator assembly 430 includes a generally cylindrical lamination stack 434 having a center bore and a plurality of teeth extending inwardly from the cylindrical portion of the lamination stack 434 defining a plurality of slots. Stator windings 434 are wound around the stator teeth within the adjacent slots. Front and rear end insulators 436 and 437 are provided on the end surfaces of the stator lamination stack 432 to insulate the lamination stack 432 from the stator windings 434. Front and rear end insulators 436 and 437 may be shaped to be received at the two ends of the stator lamination stack 432. In an embodiment, each end insulator 437 and 436 includes a radial plane that mates with the end surfaces of the stator lamination stack 432, and teeth and slots corresponding to the stator teeth and stator slots. Unlike the embodiment of FIGS. 3A and 3B, in the illustrative embodiment, terminals 438 are disposed at an axial end of the stator assembly 230, with the rear end insulator 436 including retention features disposed circumferentially around the end of the stator assembly 430 for holding the terminals 438.

Figure 14:
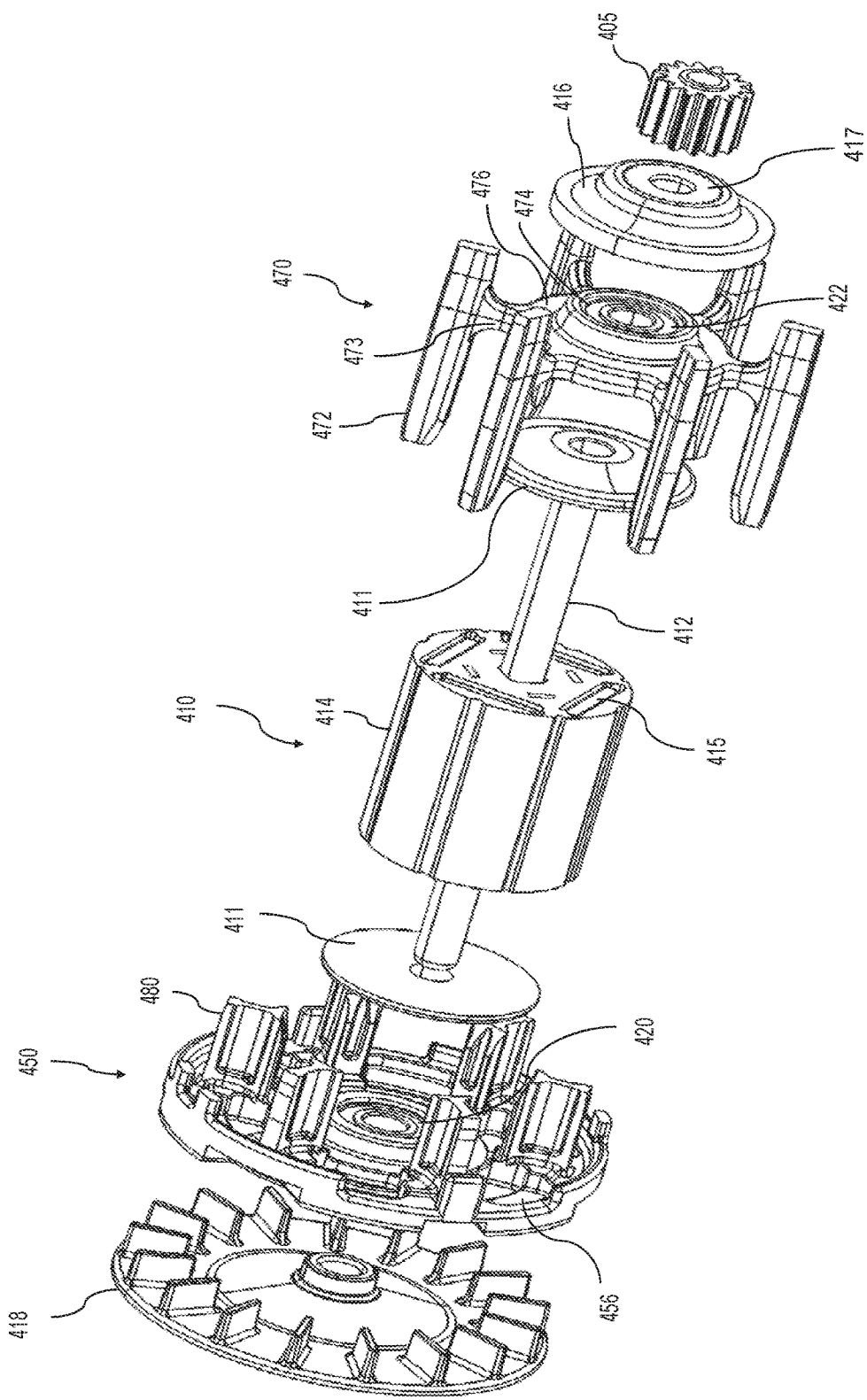
FIG. 14 depicts an exploded view of a sub-assembly including the rotor assembly, and first and second bearing support members, according to an embodiment.

FIG. 14 depicts an exploded perspective view of a sub-assembly including the rotor assembly 410 and bearing support members 450 and 470. Rotor assembly 410 is similar to and includes many of the same features as rotor assembly 210 of the first embodiment. To provide an overview, as shown in FIG. 14, and with continued reference to FIGS. 12 and 13, rotor assembly includes a rotor shaft 412, a rotor lamination stack 414 having a series of flat laminations, and permanent magnets 415 disposed within axial slots of the lamination stack 414. In an embodiment, a fan 418 is mounted on one distal end of the rotor shaft 412, and a pinion 415 is disposed one the other distal end of the rotor shaft 412 for engagement with the transmission assembly 114. In an embodiment, two rotor caps 411 are disposed on the two ends of the rotor lamination stack 414 to axially restrain the magnets 415 within the lamination stack 414. In an embodiment, rotor end caps 411 may be similar to end caps 226 shown in FIG. 3B and described later in this disclosure in great detail. In an embodiment, sense magnet 416 is disposed on the rotor 412 via a bushing 417 between the second bearing support member 470 (described below) and the pinion 415.

In an embodiment, the first bearing support member 450 is disposed on a rear side of the rotor assembly 410 between the rotor assembly 410 and the fan 418. In an embodiment, first bearing support member 450 includes many of the same features as the first bearing support member 250 previously described, including axial post inserts 280 projecting from a planar radial body and slots 456 formed between respective teeth that allow passage of airflow generated by the fan 418 through the stator assembly 430. A center portion of the first bearing support member 450 defines a bearing pocket that receives the rear rotor bearing 420 therein. In this example, the first bearing support member 450 is not provided with a hall board. It must be understood, however, that the sense magnet 416 may be disposed between the rotor lamination stack 414 and the first bearing support member 450 (e.g., in place of the corresponding rotor end cap 411), and the first bearing support member 450 may be provided with a hall board, as previously described with reference to FIGS. 3B and 4.

Figure 15A:
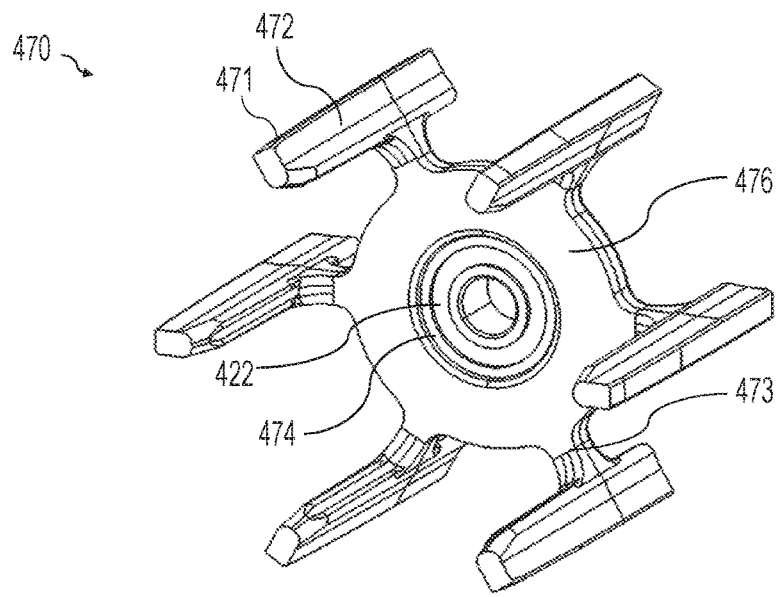
FIGS. 15A and 15B depict front and rear perspective views of the second bearing support member, according to an embodiment.
Figure 15B:
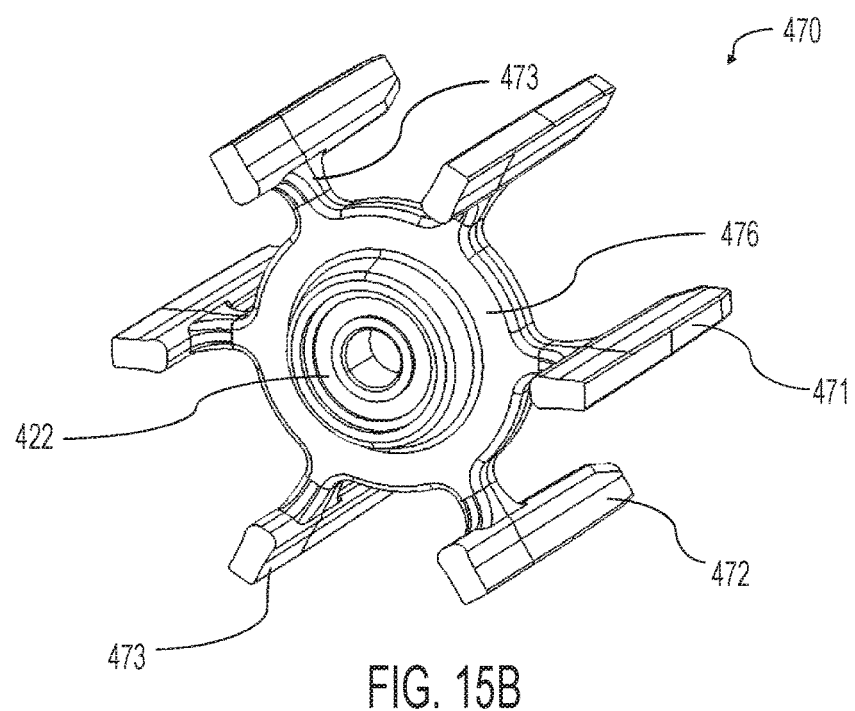

The second bearing support member 470 is described herein with reference to FIGS. 15A and 15B, and with continued reference to FIGS. 12-14. In an embodiment, second bearing support member 470 is shaped and configured to be received axially through the stator assembly 430. The second bearing support member 470, in an embodiment, includes a substantially disc-shaped planar portion 476 having a through-hole 474 in its center portion therein forming a bearing pocket for receiving the front rotor bearing 422 therein. The second bearing support member 470 further includes a series of axial post inserts 472 disposed axially around and attached to the circumference of the planar portion 476 via a series of radial connection members 473. In an embodiment, the axial post inserts 472 are sized such that a peripheral portion 471 of the axial post inserts 472 engage an inner surface of stator lamination stack 432 slots to hold and radially restrain the second bearing support member 470 within the stator lamination stack 432.

Unlike the previous embodiment, the second bearing support member 470 does not include a mating surface that mates with an outer surface of the stator assembly. This allows the second bearing support member 470 to traverse through the length of the stator lamination stack 432, with the axial post inserts 472 engaging and forcefully sliding against the inner surface of stator lamination stack 432 slots.

During the assembly process, in an embodiment, the rear and front bearings 420 and 422 are received with the bearing pockets of the first and second bearing support members 450 and 470. The first and second bearing support members 450 and 470 are then mounted (e.g., via press-fitting) onto the rotor shaft 412 on two sides of the rotor assembly 410, sandwiching the rotor assembly 410 on its two ends, to form the sub-assembly shown in FIG. 14. The fan 418, sense magnet 516, and pinion 405 may also be mounted on the rotor shaft 412 as shown in FIG. 14.

In an embodiment, the entire sub-assembly including the rotor assembly 410 and the first and second bearing support members 450 and 470 may then be axially received within the stator assembly 430, from the rear side of stator assembly where the rear end insulator 437 is located, until the rear end insulator 437 comes into contact with a mating surface of the first bearing support member 450. As the assembly is being inserted into the stator assembly 430, the axial post inserts 472 are forced against the inner surface of the stator lamination stack 432 slots, within the gaps between adjacent stator windings.

In an embodiment, similarly to the embodiment described above, the rear end insulator 437 and the first bearing support member 450 may include corresponding indentations and detents that mate together to help pilot and locate the two sub-assemblies. The rear end insulator 437 and the first bearing support member 450 also include peripheral tabs and other engagement features (e.g., U-shaped walls 408) for piloting and placement of the motor 400 within a power tool housing.

In an embodiment, the front end insulator (see FIG. 12) includes axial channels or recesses 452 that receive the end portions of the axial post inserts 472 of the second support member 470 therein as the second support member 470 is being axially pressed through the lamination stack 438.

In an embodiment, the above-described arrangement provides a motor assembly 400 in which one of the rotor bearings (i.e., front bearing 422) that radially supports the rotor assembly 410 within the stator assembly 430 is structurally supported fully within the stator assembly 430, i.e., on the inner diameter of the stator lamination stack 432 and the front end insulator 436. This arrangement significantly eases the manufacturing process, allowing both bearings 420, 422 to be mounted on the rotor shaft 412 prior to assembly of the rotor 410 into the stator assembly 430.

In addition, with this arrangement the motor 400 is provided without a front motor end cap for supporting the front bearing 422, thus reducing the length of the motor 400 by several millimeters. In an embodiment, as shown in FIG. 12, the front bearing 422 (hidden behind the sense magnet 416) may be positioned along approximately the same radial plane as the front end insulator 436 and/or the ends of the stator windings 434. Thus, the supporting structure for the front bearing 422 does not add to the overall length of the motor 400.

The third embodiment of the invention is described herein with reference to FIGS. 16-19. In this embodiment, both front and rear bearing support structures are fully supported within the stator assembly 430.

Figure 16:
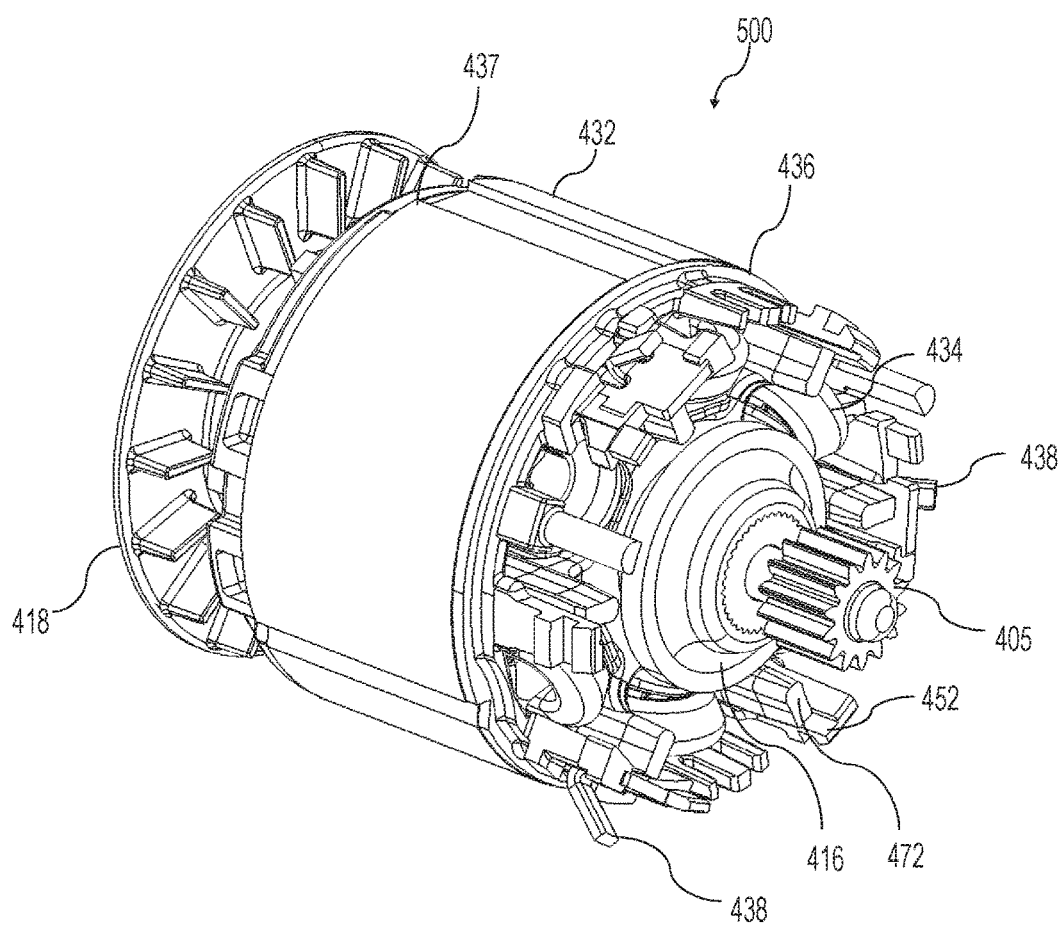
FIG. 16 depicts a perspective view of a brushless DC motor, according to yet another alternative embodiment of the invention.
Figure 17:
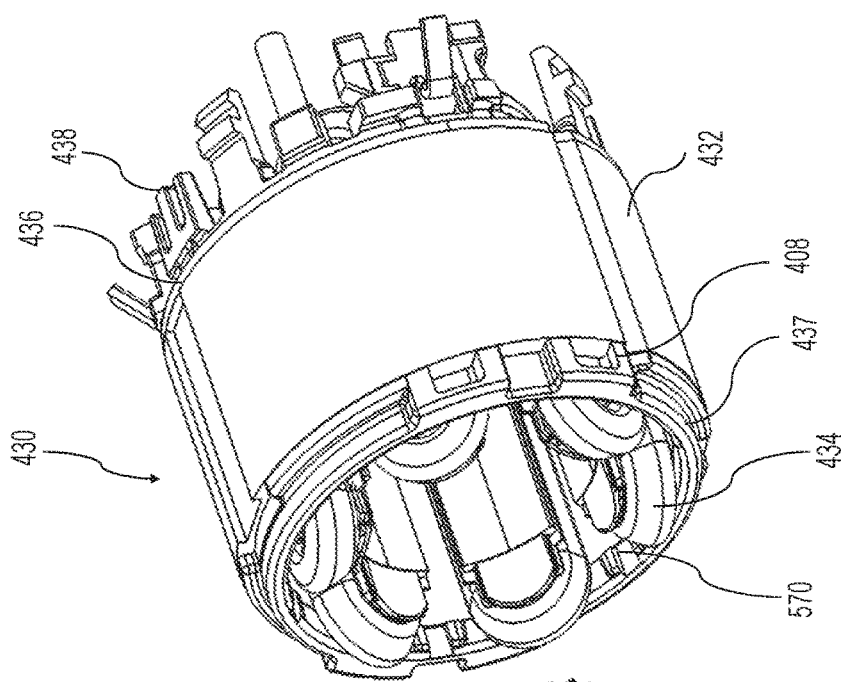
FIG. 17 depicts a partially exploded perspective view of the motor, including the stator assembly and the rotor assembly, according to an embodiment.
Figure 17:
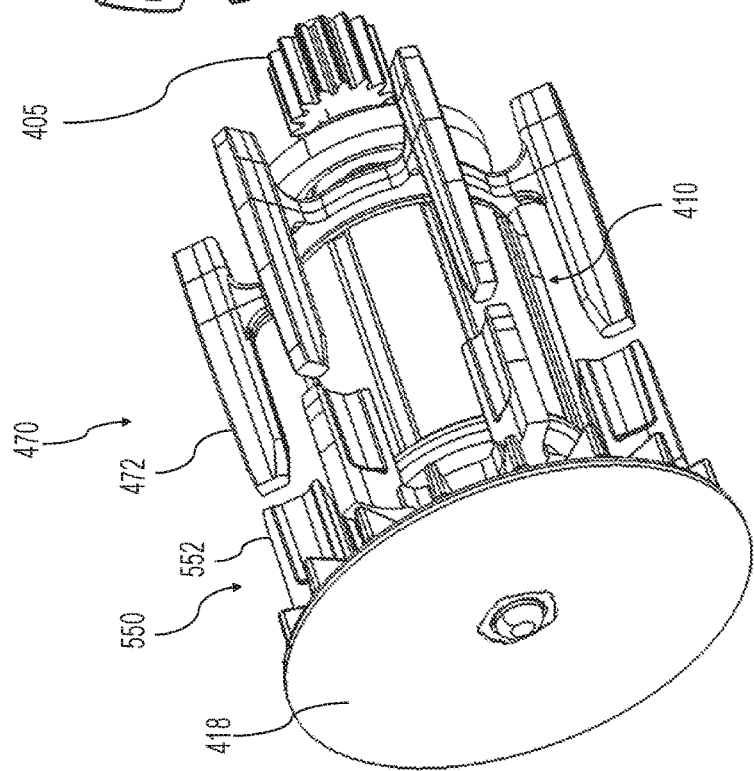

FIG. 16 depicts a perspective view of a BLDC motor 500 having internally supported bearing support structures, according to an embodiment. FIG. 17 depicts a partially exploded view of the same motor 500, according to an embodiment.

Figure 18:
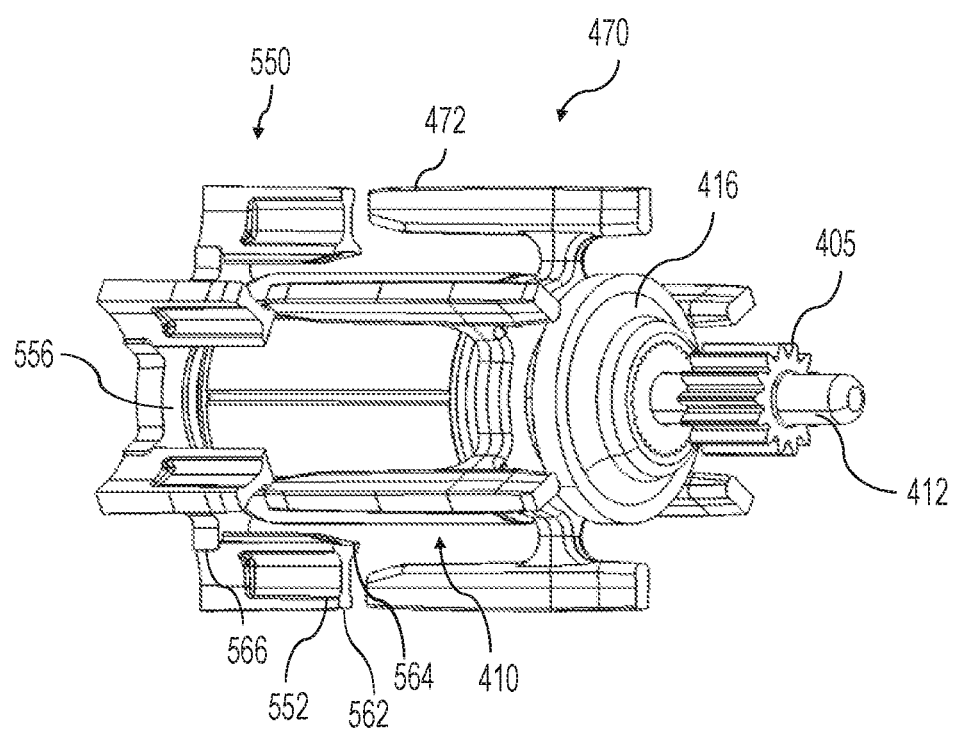
FIG. 18 depicts a perspective view of a sub-assembly including the rotor assembly, and first and second bearing support members, according to an embodiment.
Figure 19:
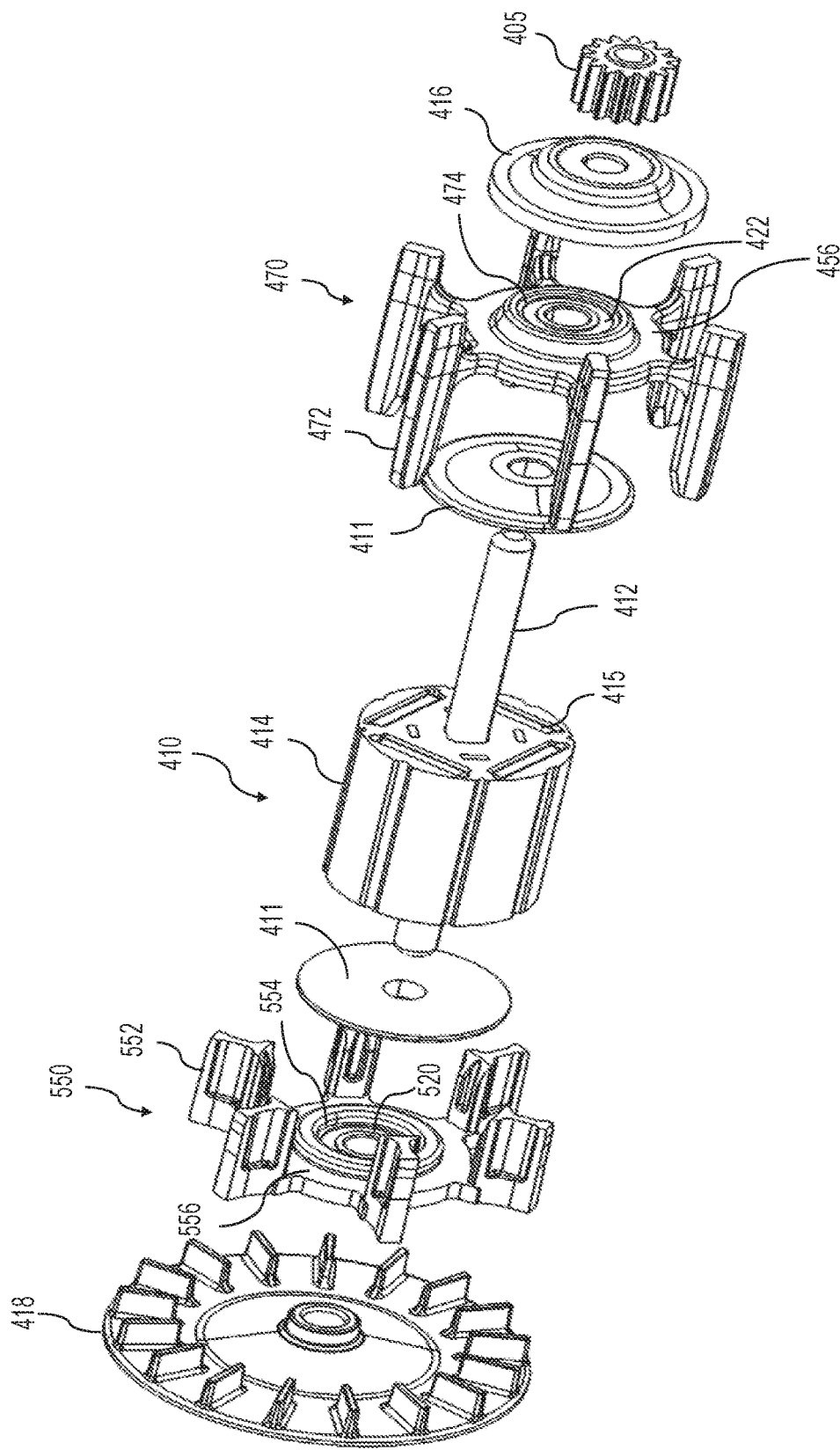
FIG. 19 depicts an exploded view of the rotor assembly and the first and second bearing support members, according to an embodiment.

FIG. 18 depicts a perspective view of a sub-assembly including the rotor assembly 410, the second bearing support member 470 as described above with reference to FIGS. 12-15B, and an alternative and/or improved first bearing support member 550, according to an embodiment. FIG. 19 depicts an exploded view of the sub-assembly shown in FIG. 18.

In an embodiment, most components of the motor 500 of this embodiment are similar to motor 400 of the second embodiment described above, with the exception of the first bearing support member 550, described here.

In an embodiment, first bearing support member 550, similarly to the second bearing support member 470, is shaped and configured to be axially received and pressed through the stator assembly 430. The first bearing support member 550, in an embodiment, includes a substantially disc-shaped planar portion 556 having a through-hole 554 in its center portion therein forming a bearing pocket for receiving the rear rotor bearing 520 therein. The first bearing support member 550 further includes a series of axial post inserts 552 disposed axially around and attached to the circumference of the planar portion 556 via a series of radial connection members. In an embodiment, the axial post inserts 552 are sized such that their peripheral portions engage an inner surface of stator lamination stack 432 slots to hold and radially restrain the first bearing support member 550 within the stator lamination stack 432.

In an embodiment, the first bearing support member 550 does not include a mating surface that mates with an outer surface of the stator assembly 430 (i.e., at end insulator 437). This allows the first bearing support member 550 to be received into the stator lamination stack 432, with the axial post inserts 552 engaging and forcefully sliding against the inner surface of stator lamination stack 432 slots.

In an embodiment, axial post inserts 552 may have a generally rectangular cross-sectional profile extending from a peripheral portion 562 (see FIG. 18), which is arranged to engage an inner surface of a corresponding lamination stack slot, to an end portion 564, which may be slightly thicker that the peripheral portion 562 and is arranged to be disposed at an open end of the lamination stack slot, between and in engagement with two adjacent stator tooth edges. In an embodiment, the peripheral portions 562 of the axial post inserts 552 align with peripheral portions of axial post inserts 472 of the second bearing support member 470.

In an embodiment, first bearing support member 550 may include a series of notches 566 (see FIG. 18) around bases of the axial post inserts 552. Rear end insulator 437 may also include corresponding detents 570 (see FIG. 17) that receive the notches 566 therein, and thus axially restrain the first bearing support member 550, when rotor assembly 410 and the two bearing support members 470 and 550 are fully inserted into the stator assembly 430.

In an embodiment, the above-described arrangement provides a motor assembly 400 in which both the rotor bearings 422 and 520 that radially supports the rotor assembly 410 within the stator assembly 430 are structurally supported fully within the stator assembly 430, i.e., on the inner diameter of the stator lamination stack 432 and the front end insulator 436, 437. With this arrangement the motor 400 is provided without front and rear motor end caps for supporting the front bearing 422, thus reducing the length of the motor 400 significantly. In an embodiment, when fully assembled, the front bearing 422 may be positioned along approximately the same radial plane as the front end insulator 436 and/or the front ends of the stator windings 434. Similarly, the rear bearing 520 may be positioned along approximately the same radial plane as the rear end insulator 437 and/or the rear ends of the stator windings 434. Thus, the supporting structures for the rear and front bearings 420 and 422 do not add to the overall length of the motor 400.

Figure 20A:
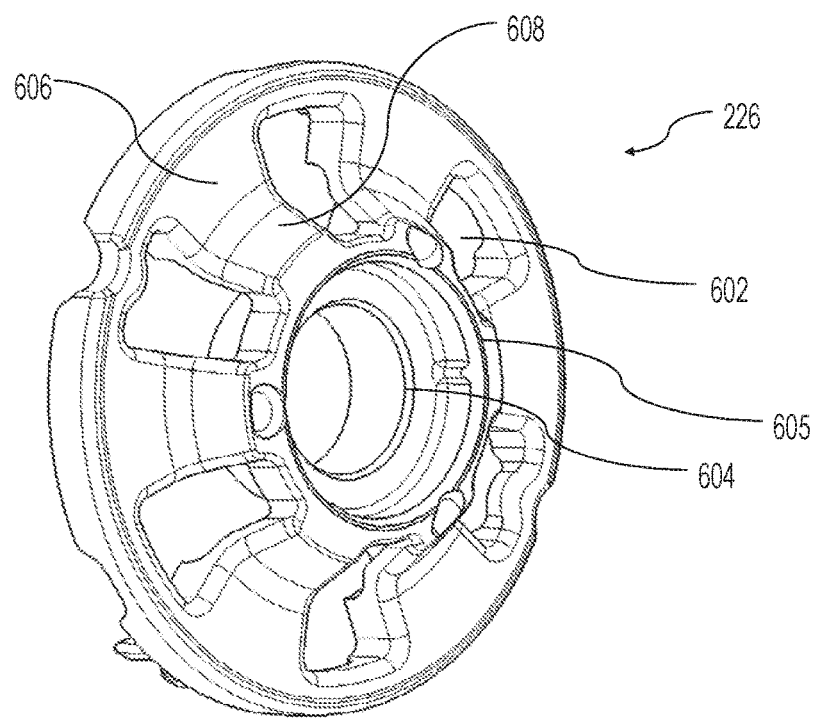
FIGS. 20A and 20B depict front and back perspective views of a rotor end cap, according to an embodiment.
Figure 20B:
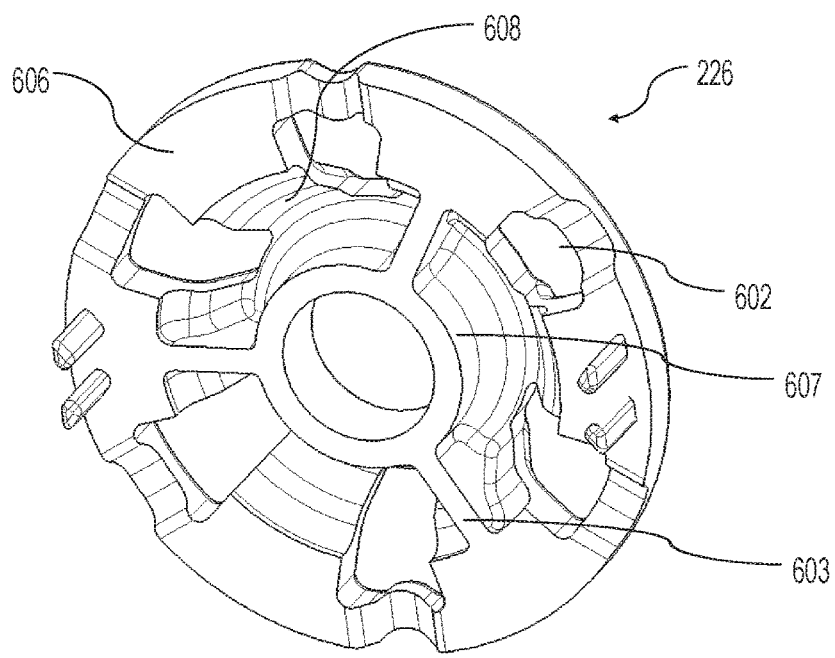

Another aspect/embodiment of the invention is described herein with reference to FIGS. 20A and 20B.

As previously described, the rotor permanent magnets are axially contained within the rotor lamination stack via two rotor end cap on both sides, or via a rotor end cap on one side and a sense magnet disc on the other. The rotor end cap may be a disc-shaped plate, as shown in the exemplary embodiments of FIGS. 14 and 19 (see end cap 411). Alternatively, as shown in FIGS. 3B and 6, an improved rotor end cap 226 may be provided to improve thermal transfer and cooling of the rotor lamination stack 210, according to an embodiment.

FIGS. 20A and 20B depict front and back perspective views of rotor end cap 226, according to an embodiment. As shown in these figures, rotor end cap 226 may include a peripheral planar portion 606 that mounted on axial end(s) of the rotor lamination stack, a center bore 604 through which the rotor shaft is received, and a series of ribs 608 disposed at an angle with respect to the plane of the planer portion 606 that extend from the planar portion 606 to a frontal end 605 of the center bore 604. A series of axial openings 602 are formed between the ribs 608, which allow air to come into contact with the end of the rotor lamination stack, including the permanent magnets. Further, the angular disposition of the ribs 608 allows the air to circulate tangentially between adjacent openings 602 under the ribs 608 and in contact with the end of the lamination stack.

In an embodiment, one or more inner walls 603 extend from the planar portion 606 to a rear end 607 of the central bore. The planar portion 606, together with the inner walls 603, engage at least a portion of the end of each of the permanent magnets, ensuring that the permanent magnets are fully axially retained within the rotor lamination stack.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A brushless direct-current (DC) motor comprising:
   a stator assembly including a generally-cylindrical stator body having a center bore, a plurality of teeth extending from the stator body towards the center bore and defining a plurality of slots in between, and a plurality of windings wound around the plurality of teeth;
   a rotor assembly rotatably received within the center bore of the stator assembly, the rotor assembly including a rotor shaft and a generally-cylindrical rotor body mounted on the rotor shaft;
   at least one rotor bearing mounted on the rotor shaft; and
   at least one bearing support member supporting the rotor bearing, the bearing support member including a radial body forming a bearing pocket at central portion thereon for receiving the rotor bearing therein, and a plurality of axial post inserts received within the plurality of slots of the stator assembly between adjacent sets of windings and engaging an inner surface of the stator body to support the rotor bearing with respect to the stator assembly along a center axis of the center bore of the stator assembly so as to maintain a circumferential gap between the rotor body and the plurality of stator teeth within the center bore of the stator assembly,
   wherein the stator assembly comprises an end insulator arranged at an end surface of the stator body to insulate the plurality of stator teeth from the plurality of windings, the radial body of the bearing support member including a mating surface that mates with a mating surface of the end insulator to form a substantially uniform cylindrical body between the stator assembly and the bearing support member.

2. The motor of claim 1, wherein the at least one rotor earing comprises a rear bearing and a front bearing disposed at two sides of the rotor body, and the at least one bearing support member comprises a first bearing support member supporting the rear bearing and a second bearing support member supporting the front bearing.

3. The motor of claim 1, wherein the radial body of the bearing support member includes a mating surface that mates with an end portion of the stator assembly to form a substantially uniform cylindrical body between the stator assembly and the bearing support member.

4. The motor of claim 1, wherein the bearing support member supports a circuit board on which a plurality of positional sensors are mounted, the positional sensors being arranged to sense a magnetic position of the rotor assembly.

5. The motor of claim 1, wherein the bearing support member comprises a plurality of openings formed around the bearing pocket to allow passage of air through the bearing support member.

6. The motor of claim 5, further comprising a fan mounted on the rotor shaft facing the bearing support member, the fan generating airflow that passes through the stator assembly and the plurality of openings of the bearing support member.

7. The motor of claim 1, wherein at least one of the plurality of axial post inserts radially extends from a peripheral portion, arranged to engage the inner surface of the stator body, to an end portion, arranged at an open end of a corresponding slot engaging edges of two corresponding stator teeth.

8. The motor of claim 7, wherein the at least one axial post includes a generally rectangular cross-sectional profile.

9. The motor of claim 1, wherein the mating surfaces of the end insulator and the bearing support member include corresponding indentations and detents arranged to mate to properly align the bearing support member with respect to the stator assembly.

10. The motor of claim 1, wherein the rotor bearing is positioned along approximately a same radial plane as at least one of the end insulator or ends of the plurality of stator windings.

11. The motor of claim 1, wherein the bearing support member is configured to be fully slidingly received within the stator assembly.

12. A power tool comprising a housing, and a brushless direct-current (DC) motor disposed within the housing for driving an output spindle of the tool, the motor comprising:
    a stator assembly including a generally-cylindrical stator body having a center bore, a plurality of teeth extending from the stator body towards the center bore and defining a plurality of slots in between, and a plurality of windings wound around the plurality of teeth;
    a rotor assembly rotatably received within the center bore of the stator assembly, the rotor assembly including a rotor shaft and a generally-cylindrical rotor body mounted on the rotor shaft;
    at least one rotor bearing mounted on the rotor shaft; and
    at least one bearing support member supporting the rotor bearing, the bearing support member including a radial body forming a bearing pocket at central portion thereon for receiving the rotor bearing therein, and a plurality of axial post inserts received within the plurality of slots of the stator assembly between adjacent sets of windings and engaging an inner surface of the stator body to support the rotor bearing with respect to the stator assembly along a center axis of the center bore of the stator assembly so as to maintain a circumferential gap between the rotor body and the plurality of stator teeth within the center bore of the stator assembly,
    wherein the stator assembly comprises an end insulator arranged at an end surface of the stator body to insulate the plurality of stator teeth from the plurality of windings, the radial body of the bearing support member including a mating surface that mates with a mating surface of the end insulator to form a substantially uniform cylindrical body between the stator assembly and the bearing support member.

13. The power tool of claim 12, wherein an inner surface of the power tool housing comprises a plurality of piloting and retaining features configured to axially support the stator assembly and the at least one bearing support member with respect to one another.

* * * * *